US011227063B2

(12) United States Patent
Bhowmick et al.

(10) Patent No.: US 11,227,063 B2
(45) Date of Patent: Jan. 18, 2022

(54) USER EXPERIENCE USING PRIVATIZED CROWDSOURCED DATA

(71) Applicant: Apple Inc., Cupertino, CA (US)

(72) Inventors: Abhishek Bhowmick, San Francisco, CA (US); Andrew H. Vyrros, San Francisco, CA (US); Umesh S. Vaishampayan, Santa Clara, CA (US); Kevin W. Decker, San Jose, CA (US); Conrad Shultz, San Jose, CA (US); Steve Falkenburg, Los Altos, CA (US); Mateusz Rajca, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/020,637

(22) Filed: Sep. 14, 2020

(65) Prior Publication Data

US 2020/0410134 A1    Dec. 31, 2020

Related U.S. Application Data

(63) Continuation of application No. 15/805,611, filed on Nov. 7, 2017, now Pat. No. 10,776,511.

(Continued)

(51) Int. Cl.
*H04L 29/06* (2006.01)
*G06F 21/62* (2013.01)
(Continued)

(52) U.S. Cl.
CPC ............ *G06F 21/6245* (2013.01); *G06F 1/28* (2013.01); *G06F 3/0483* (2013.01);
(Continued)

(58) Field of Classification Search
None
See application file for complete search history.

(56) References Cited

U.S. PATENT DOCUMENTS 7,620,667 B2   11/2009   Rollin et al.
8,661,047 B2    2/2014   Talwar et al.
(Continued)

OTHER PUBLICATIONS

Luca Melis, et al., "Efficient Private Statistics with Succinct Sketches", Proceedings 2016 Network and Distributed System Security Symposium, Jan. 1, 2016, XP055474108, 15 pgs., Reston, VA.
(Continued)

*Primary Examiner* — Jeffery L Williams
(74) *Attorney, Agent, or Firm* — Kilpatrick Townsend & Stockton LLP

(57) ABSTRACT

Embodiments described herein provide a privacy mechanism to protect user data when transmitting the data to a server that estimates a frequency of such data amongst a set of client devices. In one embodiment, a differential privacy mechanism is implemented using a count-mean-sketch technique that can reduce resource requirements required to enable privacy while providing provable guarantees regarding privacy and utility. For instance, the mechanism can provide the ability to tailor utility (e.g. accuracy of estimations) against the resource requirements (e.g. transmission bandwidth and computation complexity).

23 Claims, 18 Drawing Sheets

Related U.S. Application Data

(60) Provisional application No. 62/514,933, filed on Jun. 4, 2017.

(51) Int. Cl.

| | | |
|---|---|---|
| *H04L 9/32* | (2006.01) | |
| *H04L 29/08* | (2006.01) | |
| *H04W 12/02* | (2009.01) | |
| *G06F 3/0483* | (2013.01) | |
| *G06F 1/28* | (2006.01) | |
| *G06F 3/0482* | (2013.01) | |

(52) U.S. Cl.
CPC ........ *H04L 9/3239* (2013.01); *H04L 63/0428* (2013.01); *H04L 67/02* (2013.01); *H04L 67/22* (2013.01); *H04W 12/02* (2013.01); *G06F 3/0482* (2013.01); *H04L 2209/34* (2013.01); *H04L 2209/42* (2013.01)

(56) References Cited

U.S. PATENT DOCUMENTS

| | | | |
|---|---|---|---|
| 9,195,703 | B1 | 11/2015 | Kirmse |
| 9,402,112 | B1 | 7/2016 | Levine et al. |
| 10,599,867 | B2 | 3/2020 | Bhowmick et al. |
| 10,599,868 | B2 | 3/2020 | Barraclough et al. |
| 2003/0053622 | A1 | 3/2003 | Bruen et al. |
| 2005/0108297 | A1 | 5/2005 | Rollin et al. |
| 2009/0136023 | A1 | 5/2009 | Pan et al. |
| 2010/0008265 | A1 | 1/2010 | Freer |
| 2011/0010778 | A1* | 1/2011 | Risan ............... G11B 20/00768 726/30 |
| 2011/0064221 | A1 | 3/2011 | Mcsherry et al. |
| 2011/0208763 | A1 | 8/2011 | Mcsherry et al. |
| 2011/0268225 | A1 | 11/2011 | Cronie et al. |
| 2012/0143922 | A1 | 6/2012 | Rane et al. |
| 2012/0204026 | A1 | 8/2012 | Shi et al. |
| 2012/0260111 | A1 | 10/2012 | Tarkoma |
| 2012/0296898 | A1 | 11/2012 | Cormode et al. |
| 2012/0316956 | A1 | 12/2012 | Nath et al. |
| 2013/0145473 | A1 | 6/2013 | Cormode et al. |
| 2013/0212690 | A1 | 8/2013 | Farwaz et al. |
| 2014/0196151 | A1 | 7/2014 | Mishra et al. |
| 2014/0281572 | A1 | 9/2014 | Wang et al. |
| 2014/0283091 | A1 | 9/2014 | Zhang et al. |
| 2015/0293923 | A1 | 10/2015 | Eide et al. |
| 2015/0339493 | A1 | 11/2015 | Ioannidis et al. |
| 2015/0371059 | A1 | 12/2015 | Bilogrevic et al. |
| 2015/0372808 | A1 | 12/2015 | Bilogrevic et al. |
| 2016/0071170 | A1 | 3/2016 | Massoulie et al. |
| 2016/0203333 | A1 | 7/2016 | Fawaz et al. |
| 2016/0266824 | A1 | 9/2016 | Niu et al. |
| 2017/0018002 | A1 | 1/2017 | Champy |
| 2017/0357820 | A1 | 12/2017 | Sierra et al. |
| 2018/0181878 | A1 | 6/2018 | Kasiviswanathan et al. |
| 2018/0198602 | A1 | 7/2018 | Duffy et al. |
| 2018/0232340 | A1 | 8/2018 | Lee |
| 2018/0307854 | A1 | 10/2018 | Bernau et al. |
| 2018/0349620 | A1 | 12/2018 | Bhowmick et al. |
| 2018/0349636 | A1 | 12/2018 | Bhowmick et al. |
| 2018/0349637 | A1 | 12/2018 | Decker et al. |
| 2018/0349638 | A1 | 12/2018 | Barraclough et al. |
| 2019/0050599 | A1* | 2/2019 | Canard ................. G06F 21/602 |
| 2019/0057224 | A1 | 2/2019 | Zhang et al. |
| 2019/0332807 | A1 | 10/2019 | LaFever et al. |

OTHER PUBLICATIONS

Zhan Qin et al., "Heavy Hitter Estimation over Set-Valued Data with Local Differential Privacy", Article, Oct. 24-28, 2016, XP058299061, Vienna, Austria, 12 pgs.

Thong T. Nguyen, et al., "Collecting and Analyzing Data from Smart Device Users with Local Differential Privacy", Article, Jun. 16, 2016, XP080708811, New York, NY, 11 pgs.

Cynthia Dwork, et al., "Pan-Private Streaming Algorithms", Article, Jan. 1, 2010, XP055474103, retrieved from the internet Aug. 22, 2018, 32 pgs.

International Search Report & Written Opinion received for International Application No. PCT/US2018/024772, dated May 22, 2018, 17 pgs.

Roy, S. Setty, A. Kilzer, V. Shmatikov, E. Witchel. "Airavat: Security and Privacy for MapReduce." NSDI, 2010.

Cynthia Dwork and Aaron Roth. "The Algorithmic Foundations of Differential Privacy." Foundations and Trends in Theoretical Computer Science, vol. 9, Nos. 3-4, Aug. 2014.

Chao Li and Gerome Miklau. "An Adaptive Mechanism for Accurate Query Answering under Differential Privacy." Proc. VLDB Endowment, pp. 514-525, Feb. 2012.

Fanti, G., Pihur, V. and Erlingsson, Li. "Building a RAPPOR with the Unknown: Privacy-Preserving Learning of Associations and Data Dictionaries." Proceedings on Privacy Enhancing Technologies. vol. 2016, Issue 3, pp. 11-61.

Dwork, C., Mcsherry, F., Nissim, K., Smith, A. "Calibrating Noise to Sensitivity in Private Data Analysis." Theory of :; ryptography. TCC 2006. Lecture Notes in Computer Science, vol. 3876. Springer, Berlin, Heidelberg.

Vadhan, Sal ii. "The Complexity of Differential Privacy." Center for Research on Computation & Society John A. Paulson School of Engineering & Applied Sciences Harvard University, Aug. 9, 2016.

Chaudhuri, S., Kaushik, R. and Ramamurthy, R. "Database Access Control & Privacy: Is There a Common Ground?" In: Proceedings of CIDR 2011, pp. 96-103 (2011 ).

Liu, C., Chakraborty, S. and Mittal, P. "Dependence makes you Vulnerable: Differential Privacy under Dependent Tuples." NOSS '16, Feb. 21-24, 2016.

Ding, B., Winslett, M., Han, J., & Li, Z. "Differentially Private Data Cubes: Optimizing Noise Sources and Consistency." In Proceedings of SIGMOD 2011 and PODS 2011,2011, pp. 217-228.

Mohammed, N., Chen, R., Fung, B., and Yu, P. "Differentially Private Data Release for Data Mining." KDD'11, Aug. 21-24, 2011, pp. 493-501.

J. Hsu, M. Gaboardi, A. Haeberl en, S. Khanna, A. Narayan, B.C. Pierce, and A. Roth. "Differential Privacy: An Economic Method for Choosing Epsilon." Proc. of CSF 2014.

Ebadi, H., Sands, D. Schneider, G. "Differential Privacy: Now it's Gelling Personal." In: POPL 2015, ACM, 2015, pp. 59-81.

Kueyang Hu, et al. "Differential Privacy in Telco Big Data Platform." Proceedings of the VLDB Endowment, 8(12): 1692-1703, 2015.

Alvin, M.S., et al. "Differential Privacy: On The Trade-Off between Utility and Information Leakage." Proceedings of the 8th International Workshop on Formal Aspects of Security & Trust (FAST11 ), Springer, LNCS 7140, 2011.

Haeberlen, Andreas, et al. "Differential Privacy Under Fire." In USENIX'11, 2011.

Narayan, Arjun. "Distributed Differential Privacy and Applications." Presented to the Faculties of the University of Pennsylvania, 2015.

Ning Zhang, Ming Li, and Wenjing Lou. "Distributed Data Mining with Differential Privacy." In IEEE International :; Conference on Communications, 2011.

Narayan, Arjun Ravi, "Distributed Differential Privacy and Applications." Publicly Accessible Penn Dissertations, Jan. 1, 2015.

Hamid Ebadi and David Sands. "Featherweight PINO." CoRR, 2015.

Mohan, Prashanth. "GUPT: Privacy Preserving Data Analysis made Easy," Proceedings of the 2012 ACM SIGMOD International Conference on Management of Data, May 20-24, 2012.

Ikkus, I. et al. "Non-tracking Web Analytics." CCS'12, ACM, Oct. 16-18, 2012.

Lee, Sangmin, et al. "[pi]box: A Platform for Privacy-Preserving Apps." In 1 0th USENIX Symposium on Networked Systems Design and Implementation (NSDI '13),2013.

R. A. Popa, et al. "Privacy and Accountability for Location-based Aggregate Statistics." In Proceedings of the 18th ACM Conference on Computer and Communications Security, Oct. 17-21, 2011.

(56) References Cited

OTHER PUBLICATIONS

Kandappu, Thivya, et al. "Privacy in Crowdsourced Platforms." Springer International Publishing: Privacy in a Digital, Networked Wo?d. 2015, pp. 57-84.
Apple Inc. IOS Security Guide—Mar. 2017.
J. M. Abowd. The Challenge of Scientific Reproducibility and Privacy Protection for Statistical Agen-cies. https://www2.census.gov/cac/sac/meetings/2016-09/2016-abowd.pdf, Sep. 15, 2016. Census Scientific Advisory Committee.
G. Cormode and S. Muthukrishnan. An improved data stream summary: The count-min sketch and its applications. J. Algorithms, 55(1):58-75, Apr. 2005.
J. C. Ouchi, M. Jordan, M. J. Wainwright, et al. Local Privacy and Statistical Minimax Rates. In FOCS. IEEE, 2013.
C. Dwork, M. Naor, T. Pitassi, and G. N. Rothblum. Differential privacy under continual observation. In Proceedings of the Forty-second ACM Symposium on Theory of Computing, STOC '10, pp. 715-724, New York, NY, USA, 2010. ACM.
U. Erlingsson, V. Pihur, and A. Korolova. RAPPOR: Randomized Aggregatable Privacy-Preserving Ordinal Response. In ACM CCS, 2014.
M.Gaboardi,J.Honaker,G.King,K.Nissim,J.Ullman,S.Vadhan,andJ.Murtagh.PSI(IJJ):a Private data Sharing Interface. In Theory and Practice of Differential Privacy, 2016.
J. Hsu, S. Khanna, and A. Roth. Distributed Private Heavy Hitters. In ICALP. 2012.
S. P. Kasiviswanathan, H. K. Lee, K. Nissim, S. Raskhodnikova, and A. Smith. What Can We Learn Privately? SIAM Journal on Computing, 40(3):793-826, 2011.
A. Machanavajjhala, D. Kifer, J. Abowd, J. Gehrke, and L. Vilhuber. Privacy: Theory Meets Practice on the Map. In Proceedings of the 2008 IEEE 24th International Conference on Data Engineering, ICDE '08, pp. 277-286, Washington, DC, USA, 2008. IEEE Computer Society.
F. D. Mcsherry. Privacy integrated queries: An extensible platform for privacy-preserving data anal-ysis. In Proceedings of the 2009 ACM SIGMOD International Conference on Management of Data, SIGMOD '09, pp. 19-30, New York, NY, USA, 2009. ACM.
N. Mishra and M. Sandler. Privacy via Pseudorandom Sketches. In PODS, 2006.
Z. Qin, Y. Yang, T. Yu, I. Khalil, X. Xiao, and K. Ren. Heavy hitter estimation over set-valued data with local differential privacy. In Proceedings of the 2016 ACM SIGSAC Conference on Computer and Communications Security, CCS '16, pp. 192-203, New York, NY, USA, 2016. ACM.
International Search Report and Written Opinion for PCT/US2018/024801 dated May 23, 2018, 19 pgs.

* cited by examiner

USER EXPERIENCE USING PRIVATIZED CROWDSOURCED DATA

CROSS-REFERENCE

This application is a continuation of U.S. patent application Ser. No. 15/805,611 filed Nov. 7, 2017, which claims priority to U.S. Provisional Patent Application No. 62/514,933 filed Jun. 4, 2017, both of which are hereby incorporated herein by reference.

TECHNICAL FIELD

This disclosure relates generally to the field of differential privacy. More specifically, this disclosure relates to a system that implements an efficient differential privacy mechanism while still maintaining privacy and utility guarantees.

BACKGROUND

As the amount of information collected in an online environment grows, individuals are increasingly protective of providing various forms of information. Accordingly, differential privacy has become an important consideration for providers that aggregate online information. In a crowdsourced, client/server environment, local differential privacy introduces randomness into user data prior to a client sharing the user data with a server. A server can learn from the aggregation of the crowdsourced data of all clients, but the server cannot learn the data provided by any particular client. As more user information is gathered, general patterns begin to emerge, which can inform and enhance the user experience. Accordingly, differential privacy provides insights from large datasets, but with a mathematical proof that information about a single individual remains private.

When employing local differential privacy, a client device is required to perform various operations to create privatized data. Client device operations may include encoding data, which in certain instances (e.g. where the order of random values reaches the thousands or millions) may be resource intensive in terms of computational cost and transmission bandwidth. In addition, a server must perform correspondingly intensive operations to process the privatized data. Accordingly, there is continued need to provide efficient mechanisms for achieving local differential privacy of user data.

SUMMARY

Embodiments described herein provide a privacy mechanism to protect user data when transmitting the data to a server that estimates a frequency of such data amongst a set of client devices. In one embodiment, a differential privacy mechanism is implemented using a count-mean-sketch technique that can reduce resource requirements required to enable privacy while providing provable guarantees regarding privacy and utility. For instance, the mechanism can provide the ability to tailor utility (e.g. accuracy of estimations) against the resource requirements (e.g. transmission bandwidth and computation complexity).

One embodiment provides for a non-transitory machine-readable medium storing instructions which, when executed by one or more processors of a computing device, cause the computing device to perform operations comprising selecting a value of user data to transmit to a server from a set of possible user data values collected on a client device; creating a hash of a term for the value of user data using a random hash function, wherein the random hash function is generated from a randomly selected variant of the term, and wherein a set of possible variants of the term is indexed; encoding at least a portion of the hash of the term for the value as a vector, wherein the encoding includes updating a value of the vector at a position corresponding to the hash; privatizing the vector by changing at least some of the values of the vector with a predefined probability; and transmitting, to the server, the privatized vector and an index value of the randomly selected variant to enable the server to estimate of a frequency of the value of user data on a set of client devices.

One embodiment provides for an electronic device, comprising one or more processors and a memory coupled to the one or more processors, the memory storing instructions, which when executed by the one or more processor, cause the one or more processors to select a value of user data to transmit to a server amongst a set of possible user data values collected on a client device; create a hash of a term for the value of user data using a random hash function, wherein the random hash function is generated from a randomly selected variant of the term, and wherein a set of possible variants of the term is indexed; encode at least a portion of the created hash value as a vector, wherein to encode at least the portion of the created hash includes to update a value of the vector at a position corresponding to the created hash value; privatize the vector by changing at least some of the values of the vector with a predefined probability; and transmit, to the server, the privatized vector and an index value of the randomly selected variant, the server to estimate a frequency of the value of user data amongst a set of different client devices.

One embodiment provides for a data processing system comprising one or more processors and a memory coupled to the one or more processors, the memory storing instructions which, when executed by the processor, cause the processor to perform operations comprising selecting a value of user data to transmit to a server amongst a set of possible user data values collected on a client device creating a hash of a term for the value of user data using a random hash function, wherein the random hash function is generated from a randomly selected variant of the term, and wherein a set of possible variants of the term is indexed; encoding at least a portion of the created hash value as a vector, wherein the encoding includes updating a value of the vector at a position corresponding to the created hash value; differentially privatizing the vector by changing at least some of the values of the vector with a predefined probability; and transmitting, to the server, the privatized vector and an index value of the randomly selected variant, wherein the server estimates a frequency of the value of user data by updating a frequency table indexed by the set of possible variants.

Other features of the present embodiments will be apparent from the accompanying drawings and from the detailed description, which follows.

BRIEF DESCRIPTION OF THE DRAWINGS

Embodiments of the disclosure are illustrated by way of example, and not by way of limitation, in the figures of the accompanying drawings in which like reference numerals refer to similar elements.

DETAILED DESCRIPTION

Figure 1:
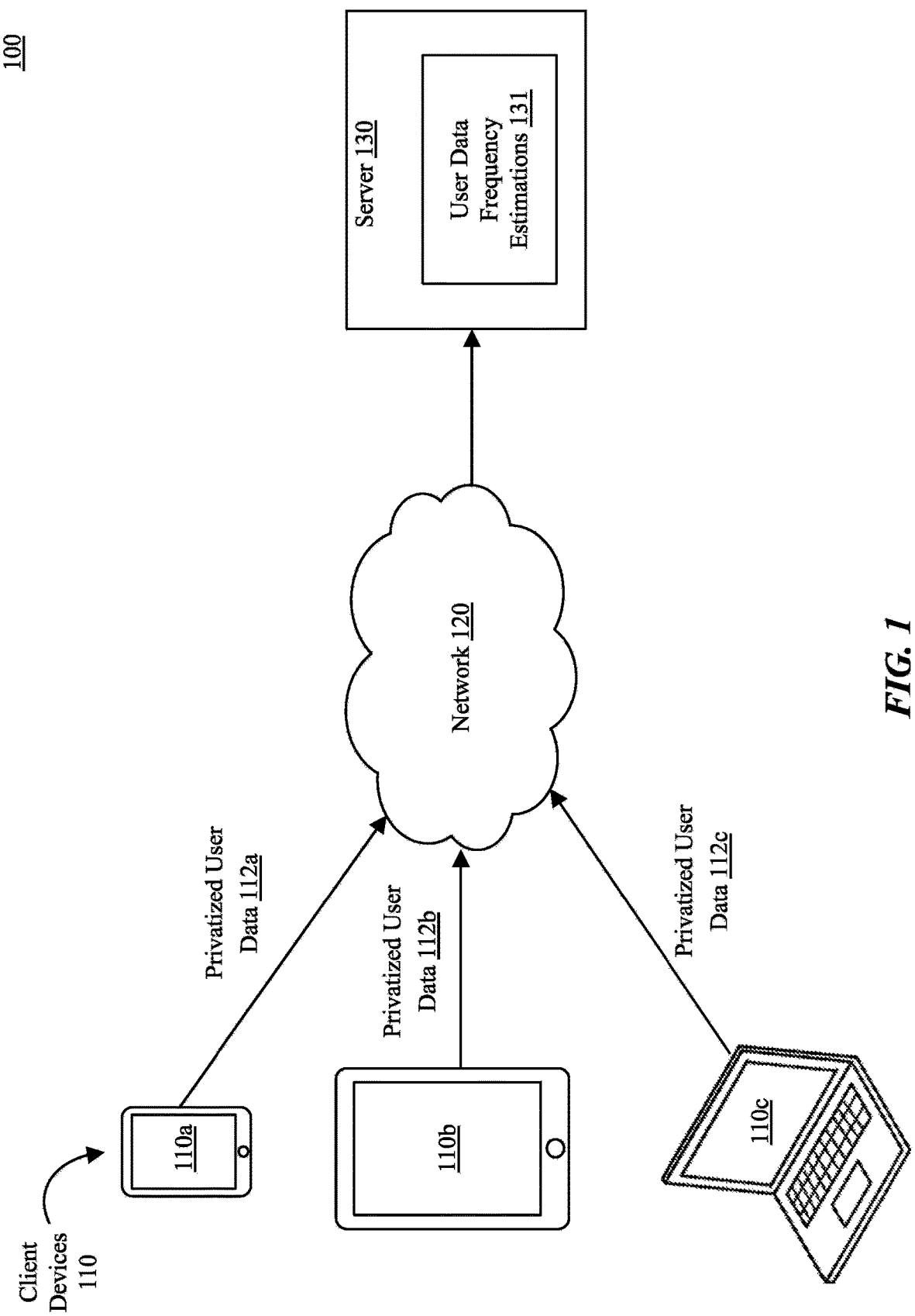
FIG. 1 is a block diagram illustrating an example overview of a system environment according an embodiment of the disclosure.

There are various situations in which the user experience for a computing device can be improved by attempting gain insight on current usage trends for those devices. For example, suggestions for predictive keyboards can be improved by determining what new words are trending or which emoji are chosen most often. Behavior of a web browser when browsing certain websites can be tuned based on detected user behavior. Additionally, battery life may be improved by determining which websites currently exhibit issues that may affect device batty life. However, such data may be considered personal to the user and should be privatized or otherwise encoded to mask the identity of a user that contributes such data. Embodiments described herein provide differential privacy encoding to user data that used to estimate a frequency of such data amongst a set of client devices. Such embodiments provide differential privacy techniques that can be used to reduce resource requirements or enhance user experience while providing provable guarantees regarding privacy and utility.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" or "some embodiments" means that a particular feature, structure, or characteristic described in conjunction with the embodiment can be included in at least one embodiment. The appearances of the phrase "embodiment" in various places in the specification do not necessarily all refer to the same embodiment.

It should be noted that there can be variations to the flow diagrams or the steps (or operations) described therein without departing from the embodiments described herein. For instance, the steps can be performed in parallel, simultaneously, a differing order, or steps can be added, deleted, or modified.

The present disclosure recognizes that the use of personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Differential Privacy Mechanism

Embodiments described herein provide a differential privacy mechanism that can be used to privatize user data gathered for crowdsourcing. As a general overview, local differential privacy introduces randomness to client user data prior to sharing the user data. Instead of having a centralized data source D={d1, ... , dn}, each data entry $d_i$ belongs to a separate client i. Given the transcript $T_i$ of the interaction with client i, it is may not be possible for an adversary to distinguish $T_i$ from the transcript that would have been generated if the data element were to be replaced by null. The degree of indistinguishability (e.g. degree of privacy) is parameterized by ε, which is a privacy parameter that represents a tradeoff between the strength of the privacy guarantee and the accuracy of the published results. Typically, ε is considered to be a small constant. In some embodiments, the ε value can vary based on the type of data to be privatized, with more sensitive data being privatized to a higher degree. The following is a formal definition of local differential privacy.

Let n be the number of clients in a client-server system, let $\Gamma$ be the set of all possible transcripts generated from any single client-server interaction, and let $T_i$ be the transcript generated by a differential privacy algorithm A while interacting with client i. Let $d_i \in S$ be the data element for client i. Algorithm A is $\varepsilon$-locally differentially private if, for all subsets $T \subseteq \Gamma$, the following holds:

$$\forall\, i \in [n],\, d \in S \left| \ln \frac{Pr[T_i \in G \mid d_i = d]}{Pr[T_i \in G \mid d_i = \text{null}]} \right| \leq \varepsilon.$$

Here, $d_i$=null refers to the case where the data element for client i is removed. In other words, an adversary having n−1 data points of a data set cannot reliably test whether the $n^{th}$ data point was a particular value. Thus, a differentially privatized dataset cannot be queried in a manner that enables the determination of any particular user's data.

The systems (and methods) disclosed herein include an $\varepsilon$-local differentially private count-mean-sketch mechanism that can provide improvements with respect to accuracy, bandwidth, and computational cost for a client and server while preserving user privacy. The private count-mean-sketch mechanism can be provided within a system environment as described herein. The use of the mean value in the count-mean-sketch mechanism enables a tradeoff between processing time and accuracy. Using other mechanisms, such as median based mechanisms, increased processing time may not result in increased accuracy. To the contrary, the count-mean-sketch mechanism can be used to obtain greater accuracy by a greater expenditure of processing time.

FIG. 1 is a block diagram of an overview of such a system 100 according an embodiment of the disclosure. As shown, the system 100 can include client devices 110A-110C (or collectively 110) and a server 130, which can be coupled via a network 120. The network 120 can be any suitable type of wired or wireless network such as a local area network (LAN), a wide area network (WAN), or combination thereof. A client device 110 can include any type of computing device such as a desktop computer, a tablet computer, a smartphone, a television set top box, or other computing device as described below in device architecture 1100 and/or system 1200. Exemplary client devices include, but are not limited to devices such as an iPhone®, Apple® Watch, Apple® TV, or other computing devices provided by Apple Inc. of Cupertino, Calif.

A client device 110 can be associated with a user within a large set of users (e.g. crowdsource). Each client device 110 can transmit privatized user data 112A-112C (collectively 112) as a differentially private sketch (or encoding). A sketch is a computed, encoded representation of a value of user data. The purpose of the sketch is to transmit the encoded representation of user data to the server, so that the server cannot directly learn the value of user data transmitted by the particular client. The user data can be any form of information such as information related to a user or information relate to user actions performed on the client device. For example, the value can include a visited website, user interaction or behavior data, words or emojis used by a user, deep links, preferences, data from a questionnaire, or any other data that a user may want or request to remain private. In one embodiment, the user data can be any form of information that is finite and from a known set. For example, the known set can include a predefined set of possible values known by the server 130.

A server 130 can accumulate privatized user data 112 and determine statistical properties such as user data frequency estimations 131 amongst a set of client devices 110. As described, the server 130 can learn from the aggregation of the crowdsourced data, but cannot learn the user data provided by any particular client device 110. The server 130 can be any kind of server or a cluster of servers and can include a cloud-based server, application server, backend server, or combination thereof.

Figure 2:
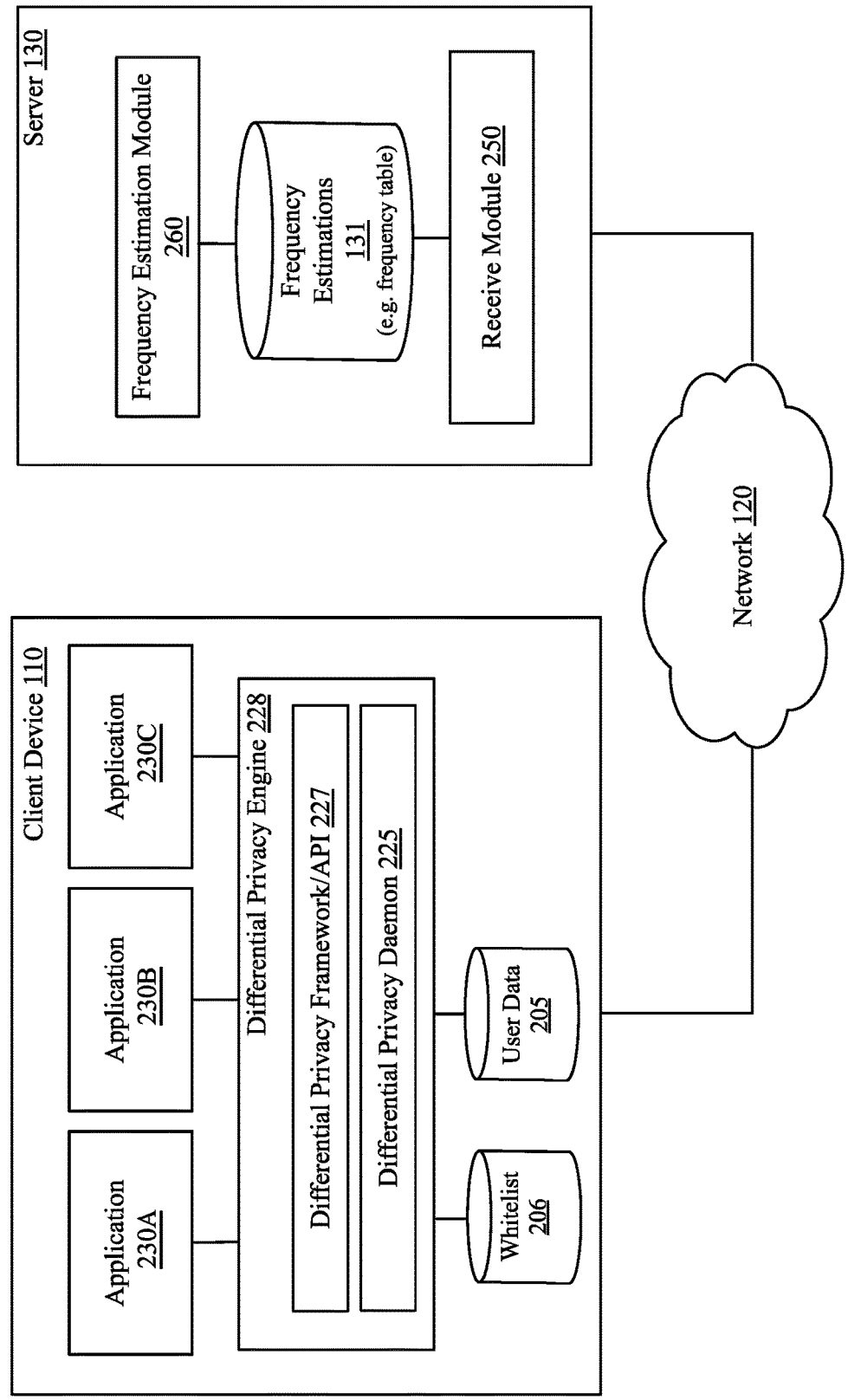
FIG. 2 is a block diagram of a system used for differentially privatizing shared user data according an embodiment of the disclosure.

FIG. 2 is a block diagram of a system 200 used for differentially privatizing user data according an embodiment of the disclosure. The client device 110 can include a differential privacy engine (DPE) 228 that includes a differential privacy daemon 225 and a differential privacy framework or application programming interface (API) 227, and a plurality of applications 230A-230C. One or more of the applications 230A-230C can create user data 205 and the DPE 228 can use various tools such as hash functions (or cryptographic hash functions) to privatize the user data 205 using the differential privacy mechanism as further described herein.

In one embodiment, the client device 110 can store information related to user interactions with an application or service. User data related to an interaction with a particular website can include information related to user interactions with various features of the website. For instance, the user data can include various information related to presentation settings of content provided by a website. For example, user interaction data in relation to auto-play of media content can be analyzed such as whether a user stops or pauses media content that auto-plays. Accordingly, various auto-play settings and/or device functionality can be adjusted based on crowdsourced user interaction patterns.

In one embodiment, the user data 205 can be stored on the client device in a differentially private form. This user data 205 in a privatized form can be shared (e.g. subsampled) with the server 130, or may be used for other purposes such as for usage and diagnostic purposes. It should be noted that even when the user data 205 is not shared with a server 130, it can still be stored in a differentially private form.

In one embodiment, a whitelist stores a list of websites (or webpages) in which particular features are enabled. For example, the whitelist may include a list of websites in which auto-play as further described herein is enabled.

Server 130 may include a receive module 250, and a frequency estimation module 260 to determine frequency estimations 131 that may be stored in various data structures such as a frequency table. The receive module 250 may asynchronously receive crowdsourced data sketches of user data for a large plurality of client devices 110. The receive module 250 can remove latent identifiers from the received sketch data. Latent identifiers can include IP addresses, metadata, session identifiers, or other data that might identify the particular client device 110 that sent the sketch. The frequency estimation module 260 can periodically process the received privatized user data 205 using operations such as, but not limited to a count-mean-sketch operation, which is a variation of the count-min-sketch operation that uses a mean instead of a minimum value. In one embodiment, the frequency estimation module 260 can update a frequency table to determine frequency estimations 131 as further described herein.

Figure 3:
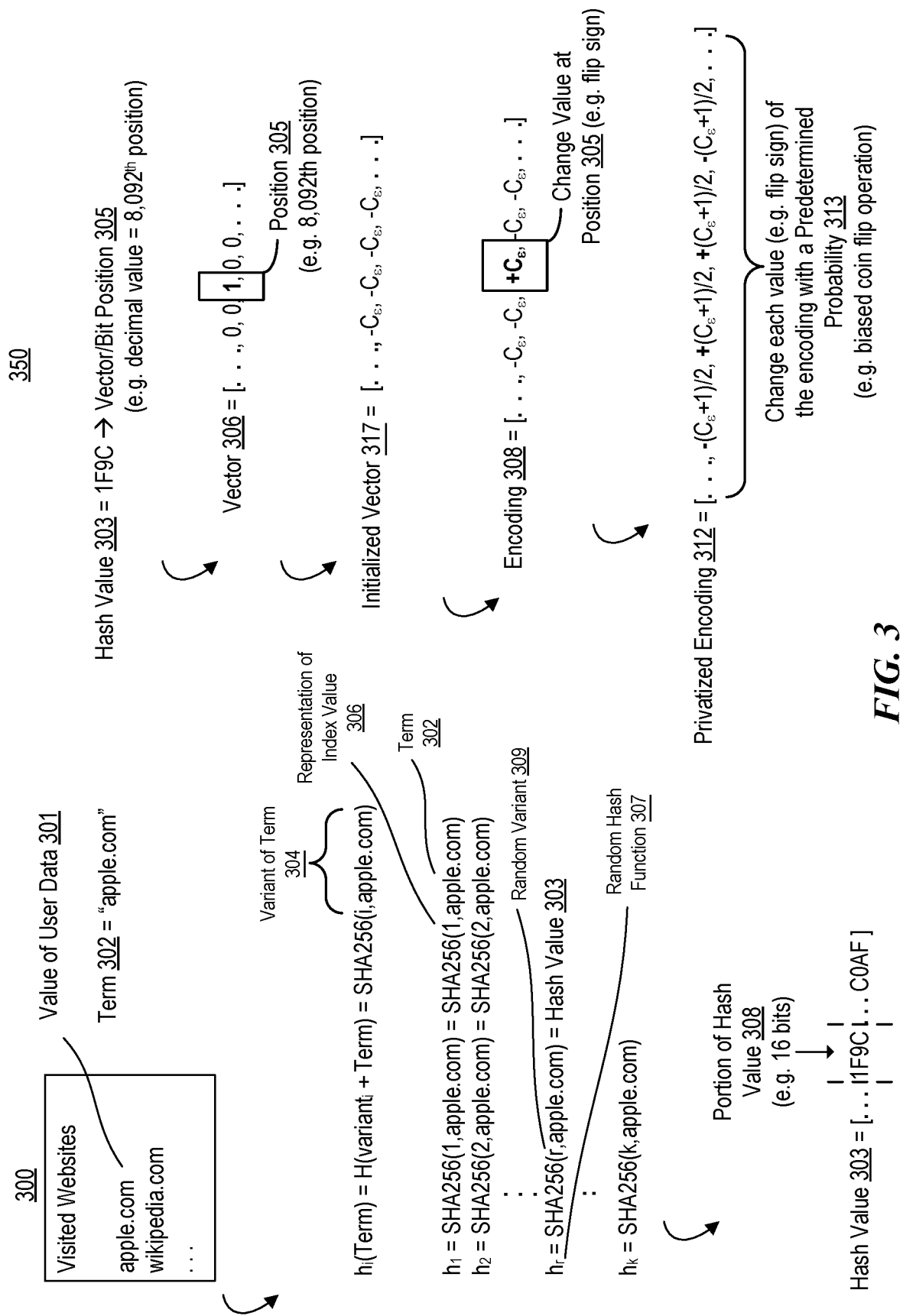
FIG. 3 is an exemplary process flow of differentially privatizing an encoding of user data according to an embodiment of the disclosure.

FIG. 3 is an example process flow of differentially privatizing an encoding of user data to be transmitted to a server according to an embodiment of the disclosure. As shown in diagram 300, the system, which can be included within client device 110 as in FIG. 1, can select a value of user data 301 to be transmitted to the server. The value of the user data 301 in the illustrated example, corresponds to a visited website. However, any type of data is contemplated, and the value of user data 301 can be represented as a term 302 in any suitable format.

As illustrated, the term can be the domain name of a visited website. However, other types of representations may be used, such as, but not limited a URI (Uniform Resource Identifier) or URL can also be used. The term can also be the visited webpage of a web site, where the representation can identify the domain name of a visited website and a particular webpage of the website. As described herein, a webpage is an individual page or document presented from or hosted by a website, although a single presented webpage can include content from multiple documents. A website is a collection of interrelated webpages presented under the same name, grouping or organization. Webpages from a website are generally, but not necessarily, hosted from the same domain. A single domain can host multiple websites, with each website including multiple webpages. As described herein, where reference is made to a website, the reference may also apply to the collection of webpages associated with the website or with the domain associated with the website.

The term 302 may be converted to a numeric value using a hash function. As illustrated, a SHA256 hash function is used in one embodiment. However, any other hash function may also be used. For example, variants of SHA or other algorithms may be used such as SHA1, SHA2, SHA3, MD5, Blake2, etc. with various bit sizes. Accordingly, any hash function (or block ciphers) may be used in implementations given they are known to both the client and server.

As described above, embodiments of the disclosure may reduce the required computational resources and bandwidth required for the differential privacy algorithm. In one embodiment, the computational logic can use a portion of a created hash value along with a variant 304 of the term 302 to address potential hash collisions when performing a frequency count by the server, which increases computational efficiency while maintaining a provable level of privacy. Variants 304 can correspond to a set of k values (or k index values) that are known to the server. In one embodiment, to create a variant 304, the system can append a representation of an index value 306 to the term 302. As shown in this example, an integer corresponding to the index value (e.g. "1,") may be appended to the URL to create a variant (e.g. "1,apple.com", or "apple.com1", etc.). The system can then select a random variant 309 (e.g. variant at random index value r). Thus, the system can generate a random hash function 307 by using a variant of the term 304 (e.g., the random variant 309), enabling a family of k hash functions to be generated from the use of variants. This family of hash functions are known to the server and the system can use the randomly selected hash function 307 to create a hash value 303. In one embodiment, in order to reduce computations, the system may only create the hash value 303 of the randomly selected variant 309. Alternatively, the system may create a complete set of hash values (e.g. k hash values), or hash values up to the randomly selected variant r. It should be noted that a sequence of integers is shown as an example of index values, but other forms of representations (e.g. various number of character values) or functions (e.g. another hash function) may also be used as index values given that they are known to both the client and server.

Once a hash value 303 is generated, the system may select a portion of the hash value 308. In this example, a 16-bit portion may be selected, although other sizes are also contemplated based on a desired level of accuracy or computational cost of the differential privacy algorithm (e.g. 8, 16, 32, 64, etc. number of bits). For example, increasing the number of bits (or m) increases the computational (and transmission) costs, but an improvement in accuracy may be gained. For instance, using 16 bits provides $2^{16}-1$ (e.g. approximately 65k) potential unique values (or m range of values). Similarly, increasing the value of the variants k, increases the computational costs (e.g. cost to compute a sketch), but in turn increases the accuracy of estimations. As described, the system may encode the value, and as shown, the encoding may be in the form of a vector 306. For example, the vector 306 may have a size of $2^{16}-1$, and each position of the vector may correspond to a potential numerical value of the created hash 303. It should be noted that a vector is described herein for convenience and mathematical purposes, but any suitable data structure may be implemented such as a string of bits, object, etc.

As shown in diagram 350 of FIG. 3, the created hash value 303 as a decimal number may correspond to a vector/bit position 305. Accordingly, a vector 306 may be encoded by updating the value (e.g. setting the bit to 1) at position 305. To account for any potential bias of a 0 or null value, the system may use an initialized vector 317. In one embodiment, the initialized vector 317 may be a vector $v \rightarrow [-1]^m \cdot c_\varepsilon$, such that $c_\varepsilon$ adds noise with mean value 0 to the initialized vector. The noise should be large enough to mask individual items of user data, but small enough to allow any patterns in the dataset to appear. It should be noted that the values are used as mathematical terms, but may be encoded using bits (e.g. $0 = +c_\varepsilon$, $1 = -c_\varepsilon$). Accordingly, vector 306 may use the initialized vector 317 to create an encoding 308 wherein the value (or bit) at position 305 is changed (or updated). For example, the sign of the value at position 305 may be flipped such that the value is $c_\varepsilon$ (or $+c_\varepsilon$) and all other values remain $-c_\varepsilon$ as shown (or vice versa).

The system can then create a privatized encoding 312 by changing at least some of the values with a predetermined probability 313. In one embodiment, the system can flip the sign (e.g. (−) to (+), or vice versa) of a value with the predetermined probability 313. As further described herein, in one embodiment the predetermined probability is $1/(1+e^\varepsilon)$.

Accordingly, the value of user data 301 is now represented as a privatized encoding 312, which individually maintains the privacy of the user. This privatized encoding 313 can be stored on the client device 110, or transmitted to the server 130. The privatized encoding 313 can be transmitted individually or as part of a batch. To further ensure privacy, the client device 110 can also subsample data. For example, a client device 110 can send only the most frequently visited website on a given day or any other time period.

It should be noted that additional bits can be added to the encoding described above to transmit additional information. For example, additional bits can be added based on categorizing values of user data as further described herein. For example, adding 2 bits (e.g. $2^2$) provides the ability to encode 4 categories. As described above, the differential privacy mechanism allows for a large universe of data elements (e.g. p), and accordingly, can provide an efficient mechanism to transmit data as described herein, that may not have been practical due to resource requirements of previous mechanisms.

Figure 4:
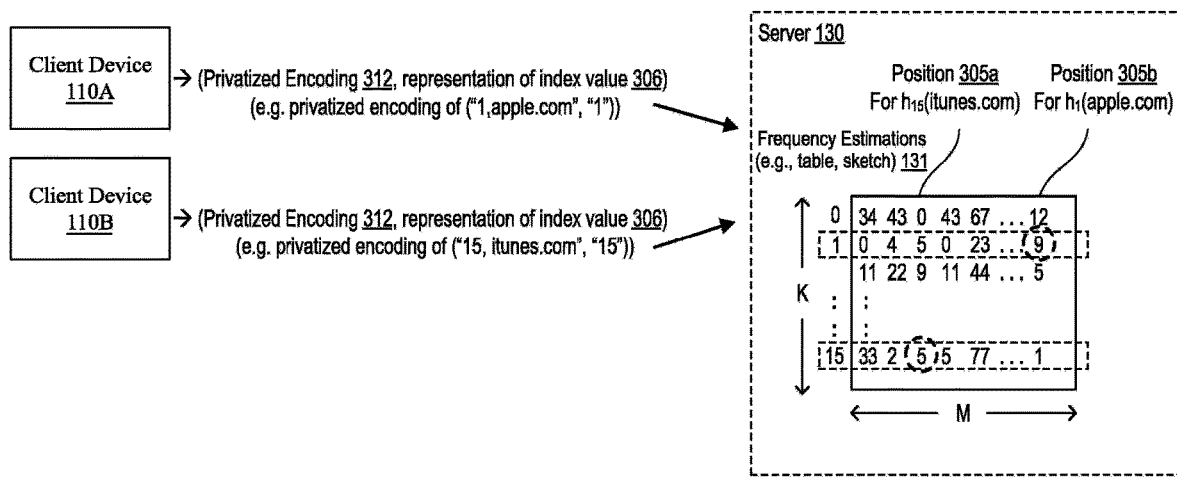
FIG. 4 illustrates an exemplary data flow for transmission of privatized encodings of user data to a server for frequency estimation, according to an embodiment.

FIG. 4 illustrates an exemplary data flow 400 for the transmission of privatized encodings of user data to a server for frequency estimation, according to an embodiment. As illustrated, a server 130 can accumulate user data in the form of privatized data from different client devices 110A-B. When transmitting information, each client device can transmit a privatized encoding 312 of user data along with the index value (or a reference to the index value) of the random variant. For example, as shown client device 110A transmits the privatized encoding 312 of visiting the apple.com website. The random variant used for such encoding corresponds to the random variant at index value 1. Accordingly, client device 110A can transmit the value "1" as the index value of the random variant. Similarly, client device 110B transmits a privatized encoding 312 of visiting the itunes.com website along with a corresponding index value of the random variant used for the encoding, which in this case is "15."

The accumulated user data can then be processed (in batch, or as a data stream) by the server to generate frequency estimations 131. In one embodiment, the server can maintain frequency estimations 131 in the form of a sketch, such as a frequency table. The frequency table can be indexed by the set of possible variant index values k. A row of the frequency table corresponding to the index value of the randomly selected variant is then updated with the privatized vector. In one embodiment, the frequency estimation can be based on a count-mean-sketch. For a particular term (e.g., term 302 as in FIG. 3), the server 130 can calculate each variant of the family of hash values and add the corresponding frequency to a list. The server 130 can calculate the frequency for the particular term (e.g., term apple.com). For instance, hash value of $h_1$(apple.com)= SHA256(1,apple.com)=position 305b. The server can obtain the frequency at the corresponding position (e.g. 9 as shown) and add the frequency to the list. The server can obtain frequencies for all values 1-k to obtain a list of all frequencies for a term. The server can then determine a mean value (e.g. count-mean-sketch) of the frequencies in the list. It should be noted, however, that other counting technique can also be used such as count minimum, median, or maximum sketch. The described mechanism enables frequency estimation having accurate bounds on variance, whereas previous mechanisms typically only provided upper bounds. For example, and in one embodiment, the server 130 can estimate the frequency of an arbitrary element s as a random variable $X_s$ whose mean equals the true count and standard deviation bounded by $\sigma\sqrt{n}$, where $\sigma$ is defined by the equation:

$$\sigma = \left(\sqrt{\frac{c_\varepsilon^2 - 1}{4} + \frac{1}{m} + \frac{\Sigma_i f_i^2}{n \cdot k \cdot m}}\right)$$

Figure 5:
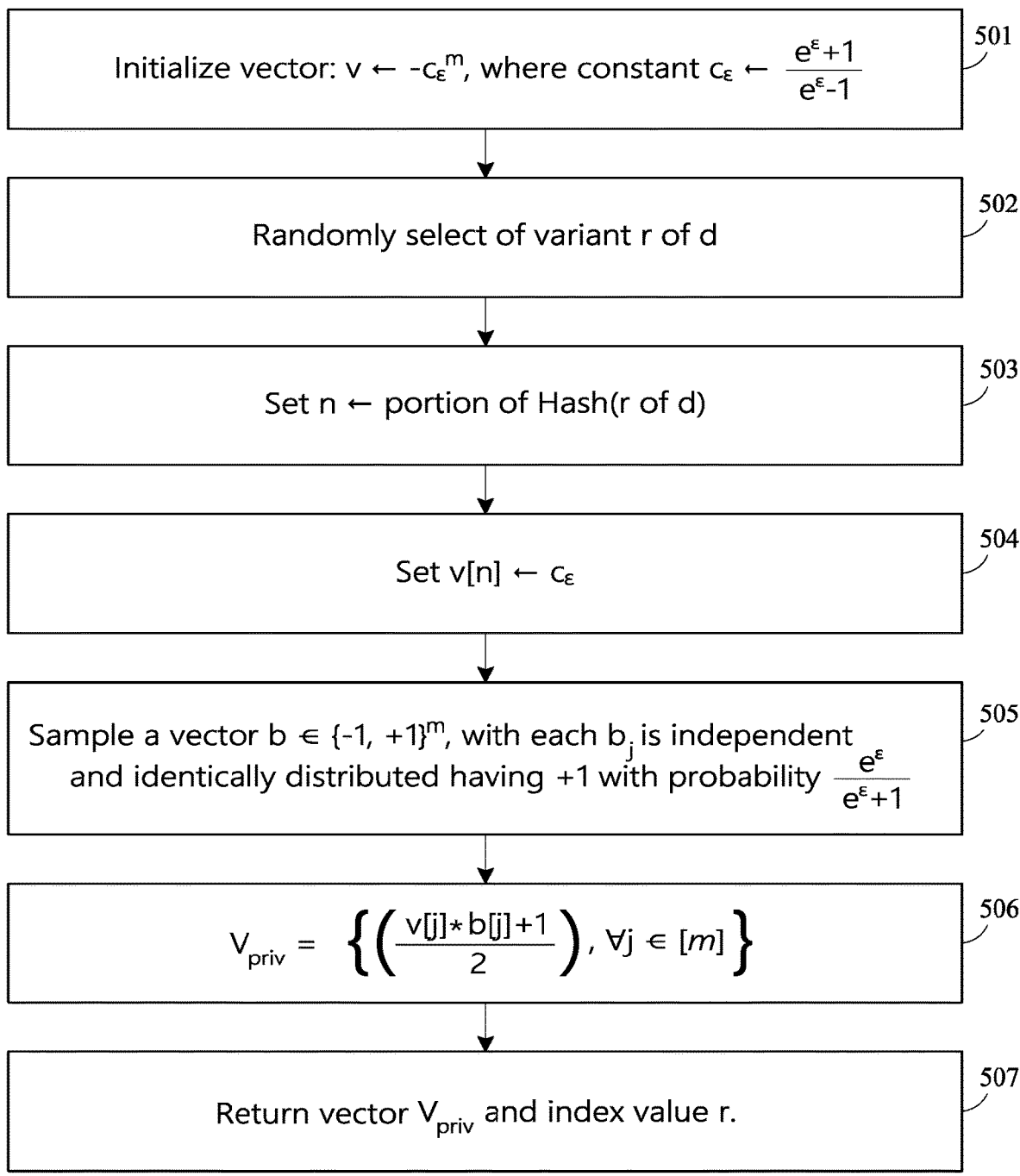
FIGS. 5-6 describe a mathematical algorithms of differential privacy mechanisms according to embodiments described herein.
Figure 6:
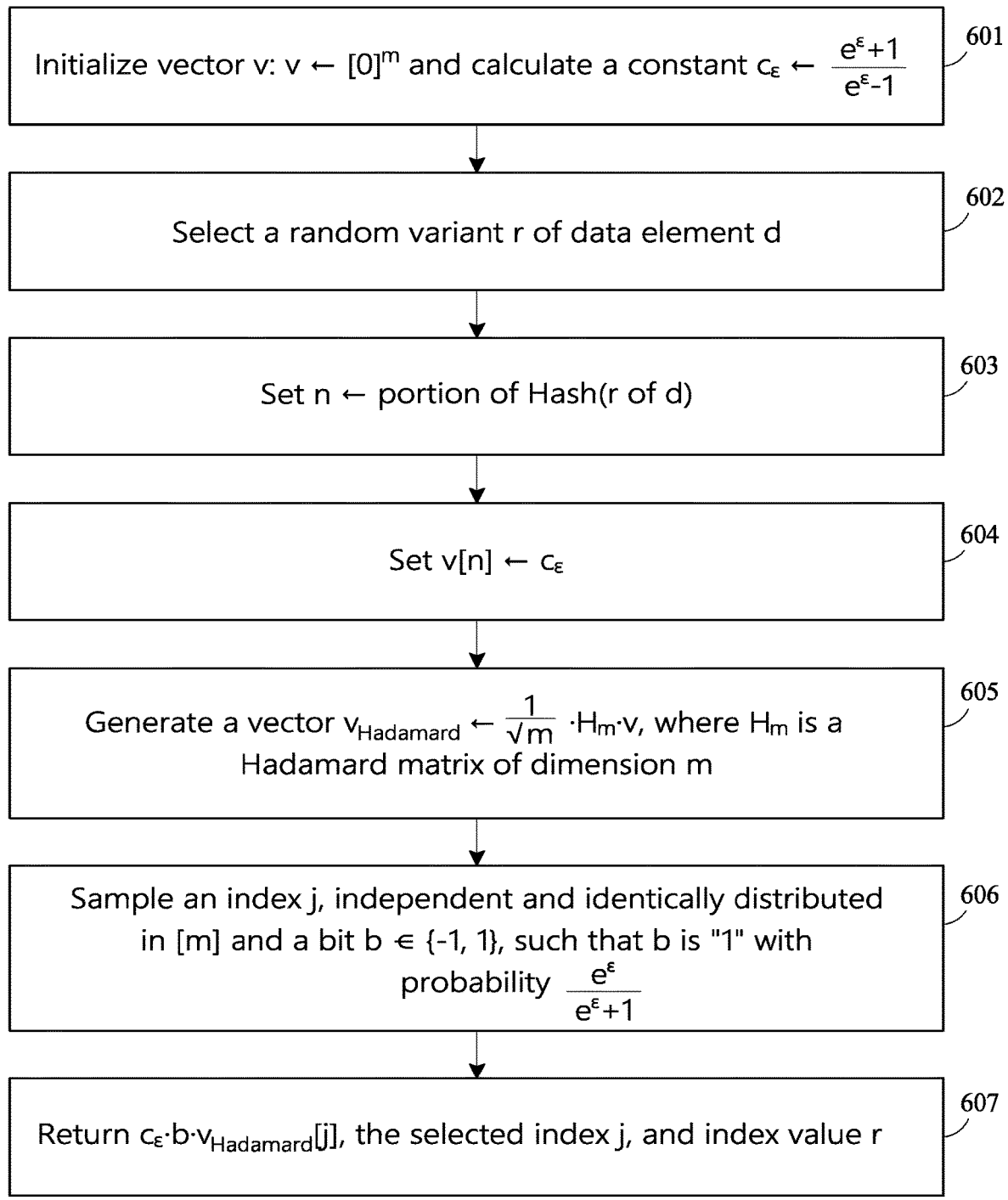

FIGS. 5-6 describe a more formal (mathematical) algorithm of the differential privacy mechanism according to an embodiment. As described, the system can create a sketch (e.g. privatized encoding 312) to provide a succinct data structure to maintain a frequency of a domain of elements $S=\{s_1, \ldots, s_p\}$ present in a data stream $D=\{d_1, \ldots\}$. Accordingly, an ε-local differentially private version of a count-mean-sketch can be used on a server to generate a frequency oracle that maintains user privacy. A frequency oracle is a function that returns an estimated count of a data item s∈S based on data received $D=\{d_1, \ldots\}$ from n clients. The differential privacy mechanism can be one of two types:
(1) an ε-local differentially private implementation, $A_{CLIENT}$, or (2) a Hadamard ε-local differentially private implementation, $A_{CLIENT\text{-}Hadamard}$.

FIG. 5 illustrates a process 500 of an ε-local differentially private implementation, $A_{CLIENT}$ according to an embodiment of the disclosure. The process 500 can be implemented via an algorithm performed by processing logic described herein, which can include software, hardware, or a combination thereof. For example, the process 500 can be performed by a system such as system 100 as in FIG. 1.

The client-side ε-local differentially private algorithm, $A_{CLIENT}$, can include: (1) privacy parameter, ε; (2) hashing range, m; (3) an index value r; and (4) data element: d∈S. Accordingly, the system (e.g. client device 110) can implement an algorithm $A_{CLIENT}$, to generate the ε-local differentially private sketch based on the following operations.

In operation 501, the system can calculate a constant $$c_\varepsilon \leftarrow \frac{e^\varepsilon + 1}{e^\varepsilon - 1},$$

and initialize vector v: $v \leftarrow -c_\varepsilon^m$. Constant $c_\varepsilon$ allows the noise added to maintain privacy at mean zero to remain unbiased.

In operation 502, the system can select a random variant r of data element d.

In operation 503, the system can set n←portion of Hash(r of d).

In operation 504, the system can set $v[n] \leftarrow c_\varepsilon$.

In operation 505, the system can sample a vector b∈{−1,+1}$^m$, where each $b_j$ is independent and identically distributed having +1 with probability $$\frac{e^\varepsilon}{e^\varepsilon + 1}.$$

In operation 506, the system can generate $$v_{priv} = \left\{\left(\frac{v[j] * b[j] + 1}{2}\right), \forall j \in [m]\right\}.$$

In operation 507, the system can return vector $v_{priv}$ and index value r.

FIG. 6 illustrates a method (or algorithm) 600 of an Hadamard version of the ε-local differentially private implementation, $A_{CLIENT}$-Hadamard according to an embodiment of the disclosure. The client-side $A_{CLIENT}$-Hadamard version of the ε-local differentially private implementation can include: (1) privacy parameter, ε; (2) hashing range, m; (3) an index value, r; and (4) data element: d∈S. Accordingly, the system (e.g. client device 110 in system 100 of FIG. 1) can use algorithm $A_{CLIENT\text{-}Hadamard}$ to generate the Hadamard version of the ε-local differentially private implementation based on the following operations.

In operation 601, the system can calculate a constant $$c_\varepsilon \leftarrow \frac{e^\varepsilon + 1}{e^\varepsilon - 1},$$

and initialize a vector v: $v \leftarrow [0]^m$.

In operation 602, the system can select a random variant r of data element d.

In operation 603, the system can set n←portion of Hash(r of d).

In operation 604, the system can set v[n]←$c_\varepsilon$

In operation 605, the system can generate a vector where $$v_{Hadamard} \leftarrow \frac{1}{\sqrt{m}} \times H_m \times v$$

$H_m$ is a Hadamard matrix of dimension m. A Hadamard matrix is a square matrix whose entries are either +1 or −1 and whose rows are mutually orthogonal.

In operation 606, the system can sample an index j, independent and identically distributed in [m] and a bit b∈{−1, 1} such that b is +1 with probability $$\frac{e^\varepsilon}{e^\varepsilon + 1}.$$

In operation 607, the system returns $c_\varepsilon \cdot b \cdot v_{Hadamard[j]}$, the selected index j, and index value r.

Based on the particular algorithm (or method) used by the client devices, a server (e.g. server 130) can generate a frequency table or other data structure to perform frequency estimations of values of user data amongst different client devices. As described, the estimation can be based on a count-mean-sketch (e.g. a variation of a count-min-sketch). Values of the frequency table can be incremented based on whether the client used the ε-local differentially private sketch algorithm, $A_{CLIENT}$, or the Hadamard ε-local differentially private sketch algorithm $A_{CLIENT-Hadamard}$. The operations for each are described below.

In the case that the client used the $A_{CLIENT}$ algorithm to accumulate a sketch, then vector $v_{priv}$ is added to the matching sketch data $W_{k,m}$, as follows:

For row $W_h$, corresponding to the selected variant that was used to generate $v_{priv}$, set $W_h$ to $W_h+v_{priv}$.

In the case that the client used the $A_{CLIENT-Hadamard}$ algorithm to generate the sketch, then vector $v_{Hadamard}$ is added to the matching sketch data $W_{k,m}$, as follows:

1. For row $W_h$, corresponding to the selected variant that was used to generate $v_{Hadamard}$, set $W_h=W_h+v_{Hadamard}$.
2. Before determining a count-mean-sketch W, convert the rows from Hadamard basis to standard basis:

$W[i]=\sqrt{m}\times H_m \times W[i]$, "i∈k, where $H_m$ is a Hadamard matrix of dimension m.

Figure 7:
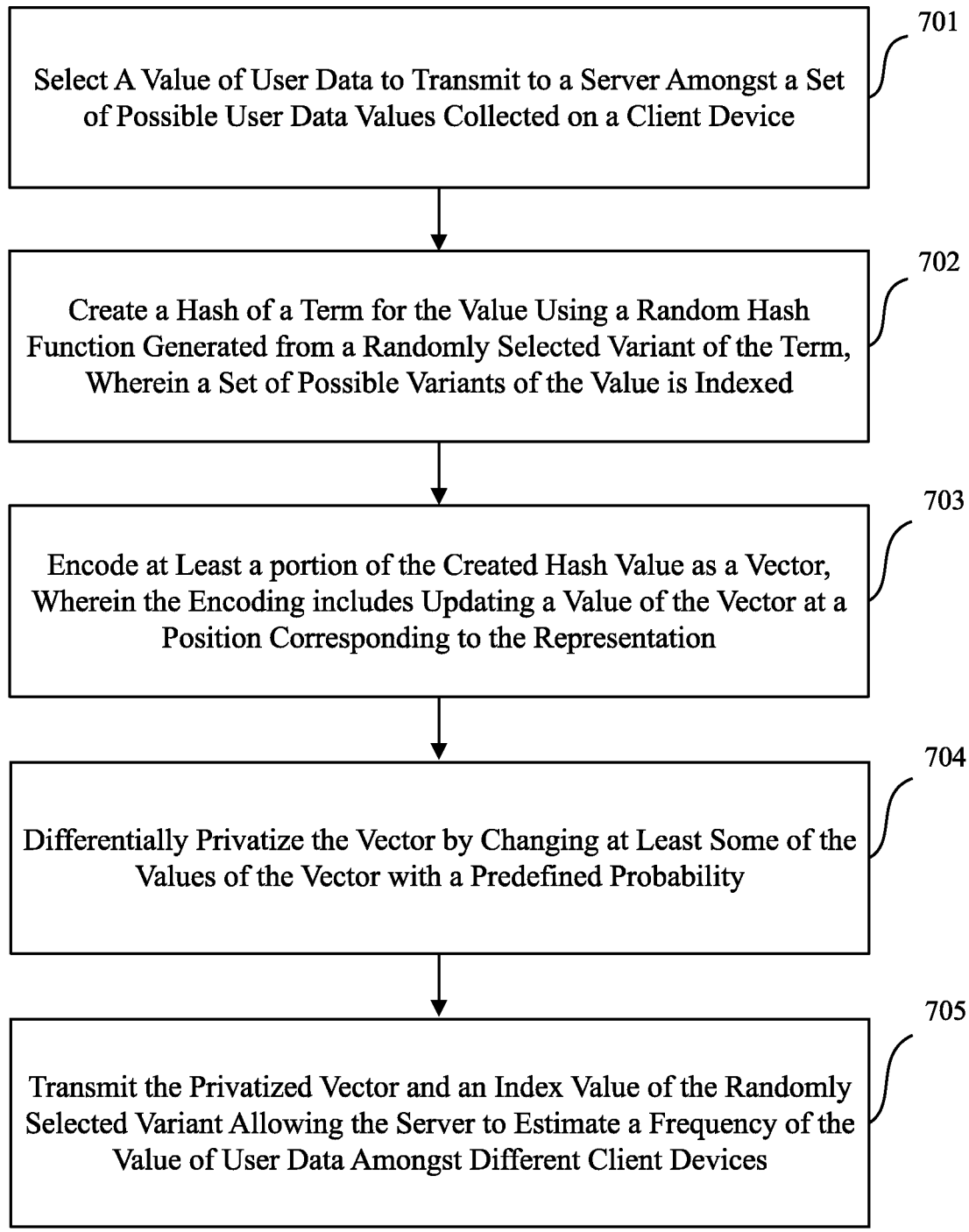
FIG. 7 is an exemplary flow diagram illustrating a method of differentially privatizing an encoding of user data to be transmitted to a server according to an embodiment.

FIG. 7 is an example flow diagram illustrating a process 700 to differentially privatizing an encoding of user data to be transmitted to a server according to an embodiment of the disclosure. The process 700 can be performed via processing logic that can include software, hardware, or a combination thereof. For example, process 700 can be performed by system 100 as in FIG. 1 via client device 110.

In 701, the system can select a value of user data to transmit to a server amongst a set of possible user data values collected on a client device.

In 702, the system can create a hash of a term for the value of user data using a random hash function. To generate a random hash function, the system can use a randomly selected variant of the term to hash. In one embodiment, set of possible variants of the value can be indexed. In one embodiment, the value of user data can be a string of characters and the set of possible variants of the value of user data includes one or more characters representing a corresponding index value of the variant appended to the string.

In 703, the system can encode at least a portion of the created hash value as a vector. In one embodiment, the encoding includes updating a value of the vector at a position corresponding to the representation. For example, the sign of the value at a position corresponding to the representation can be flipped. In one embodiment, the encoding can include initializing the vector with a uniform value and sign. In one embodiment, initializing the vector can further include multiplying each value of the vector with a constant $c_\varepsilon=(e^\varepsilon+1)/(e^\varepsilon-1)$. In addition, as described above, the encoded vector can also be in the form of a Hadamard matrix.

In 704, the system can differentially privatize the vector by changing at least some of the values of the vector with a predefined probability. In one embodiment, the predefined probability can be $1/(1+e^\varepsilon)$, where ε is a privacy parameter.

In 705, the system can transmit the privatized vector and an index value of the randomly selected variant to a server. As described, the server can estimate a frequency of the value of user data amongst a set of different client devices. The server can estimate the frequency of the value of user data by updating a frequency table indexed by the set of possible variants. For example, a row or column of the frequency table corresponding to the index value of the randomly selected variant can be updated with the privatized vector. In addition, only the privatized vector and the index value of the randomly selected variant can be transmitted to the server as information representing the value of user data. In one embodiment, the randomly selected variant can prevent hash collisions when using only the portion of the created hash value, and can also reduce a number of computations required by the server to create the frequency table while still maintaining ε-local differential privacy of the user data values.

Using Privatized Crowdsourced Data to Improve a User Experience

In another aspect of disclosure, described is system (and method) that uses the differential privacy mechanism described herein to collect crowdsourced data to enhance a user experience. For example, a user experience can be enhanced by inferring potential user preferences from analyzing crowdsourced user interaction data. In some embodiments, crowdsourced data in relation to particular websites, applications, or services may be collected. For example, in one embodiment, user interactions in relation to the presentation of content such as content from online sources can be analyzed. In addition, in one embodiment, websites that exhibit particular characteristics may be determined while masking the identity of user that contribute to the determination of those characteristics. For example, websites that consume a certain degree of client resources may be identified using privatized crowdsourced data. The data is collected into a privatized crowdsourcing dataset in which the identity of individual contributors is masked. Contributor data can be masked on a user device of the contributor before the contributed is transmitted for inclusion in the dataset. Differential privacy can be maintained for the crowdsourcing dataset, such that the identity of individual contributors to the dataset cannot be determined via multiple structured queries to the dataset. For example, a dataset can be privatized such that an adversary with any background knowledge on the dataset cannot deduce that a particular record in the input dataset was significantly more responsible for an observed output than was a collection of other input records.

The number of contributions to the crowdsourcing dataset can be limited for a given user within a given time period. In one embodiment, a privacy budget is established for a specific type of crowdsourced data. The number of contributions from each user is then limited based on the privacy budget. The privacy budget for a specific type of data can also be associated with the ε value (privacy parameter) that is used when privatizing the specific type of data. The privacy budget and privacy parameters for different types of data can vary, for example, based on the sensitivity of the data.

While differential privacy techniques are described herein, other methods of privatizing user data can be employed as an alternative to or in addition to the differential privacy techniques described herein. Some embodiments can implement other privatization techniques including secure multi-party computation and/or homomorphic encryption. Secure multi-party computation enables multiple parties to jointly compute a function over their inputs while keeping those inputs private. Homomorphic encryption is a form of encryption that allows computations to be carried out on ciphertext (encrypted data), thus generating an encrypted result which, when decrypted, matches the result of operations performed on the plaintext. In all embodiments, user data that is to be used for crowdsourcing is sanitized before transmission. Additionally, user data that is to be transferred can be locally stored in a privatized encoding.

Figure 8A:
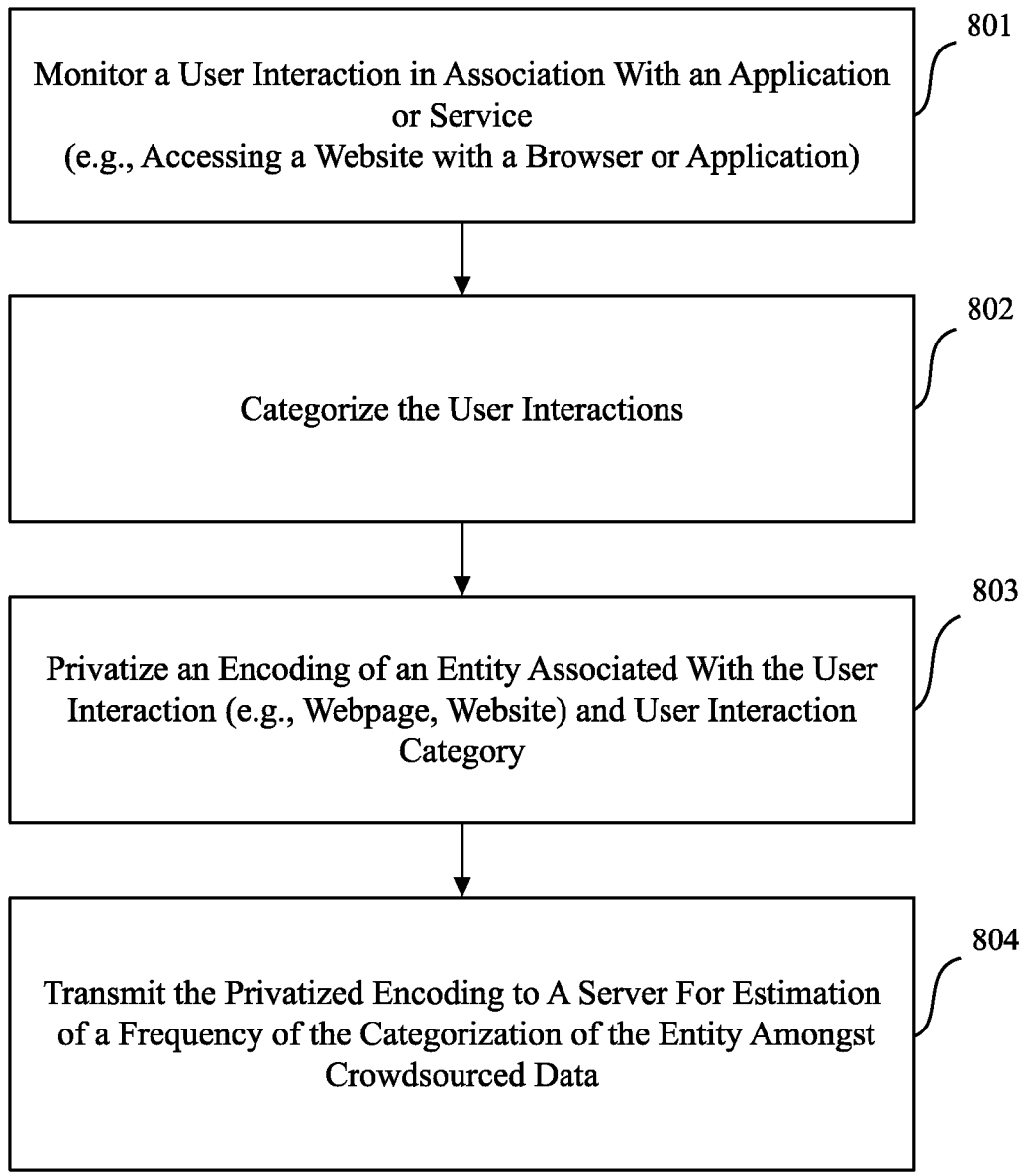
FIGS. 8A-8F are exemplary flow diagrams and illustrations regarding crowdsourcing user interaction and device resource consumption data, according to an embodiment.
Figure 8B:
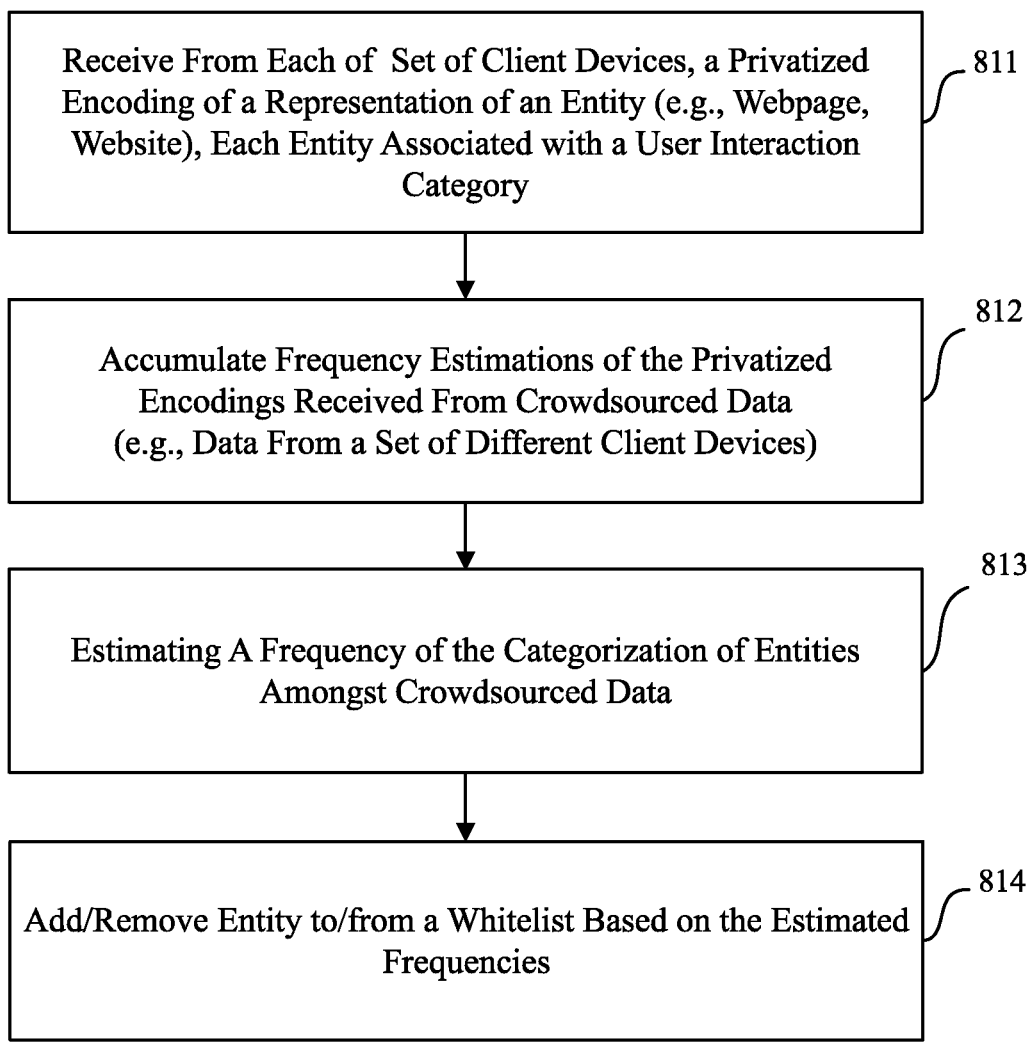
Figure 8C:
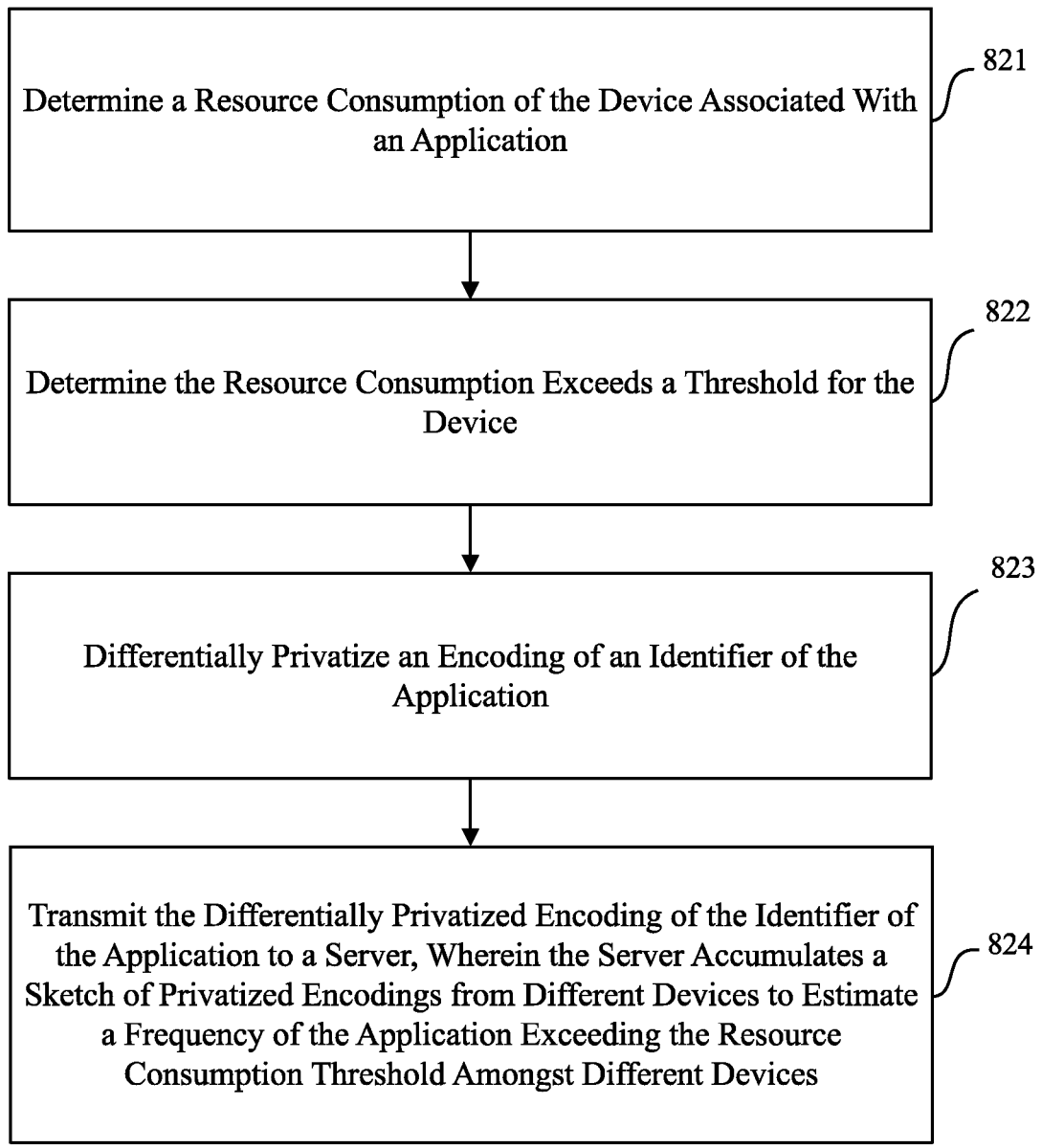
Figure 8D:
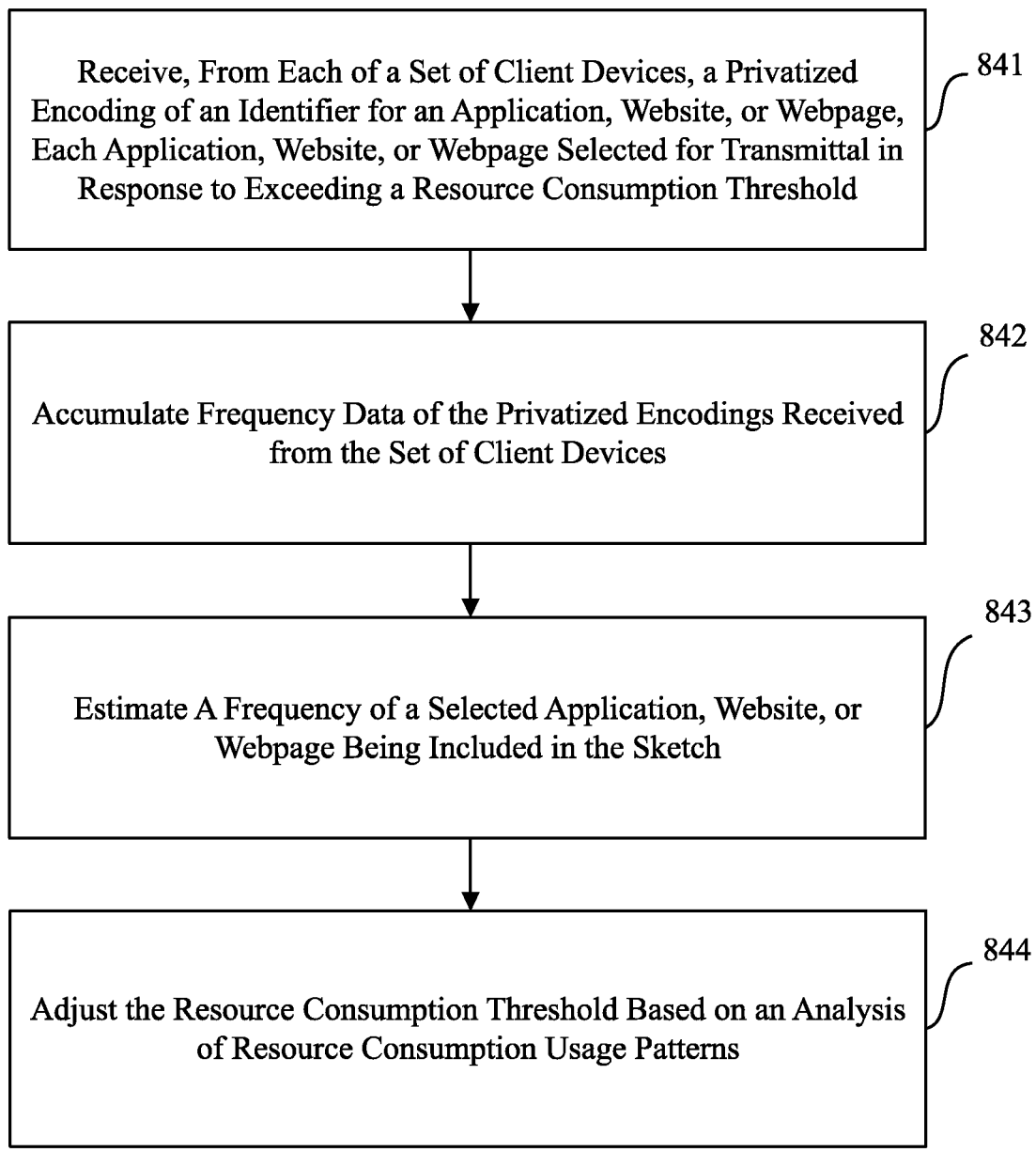
Figure 8E:
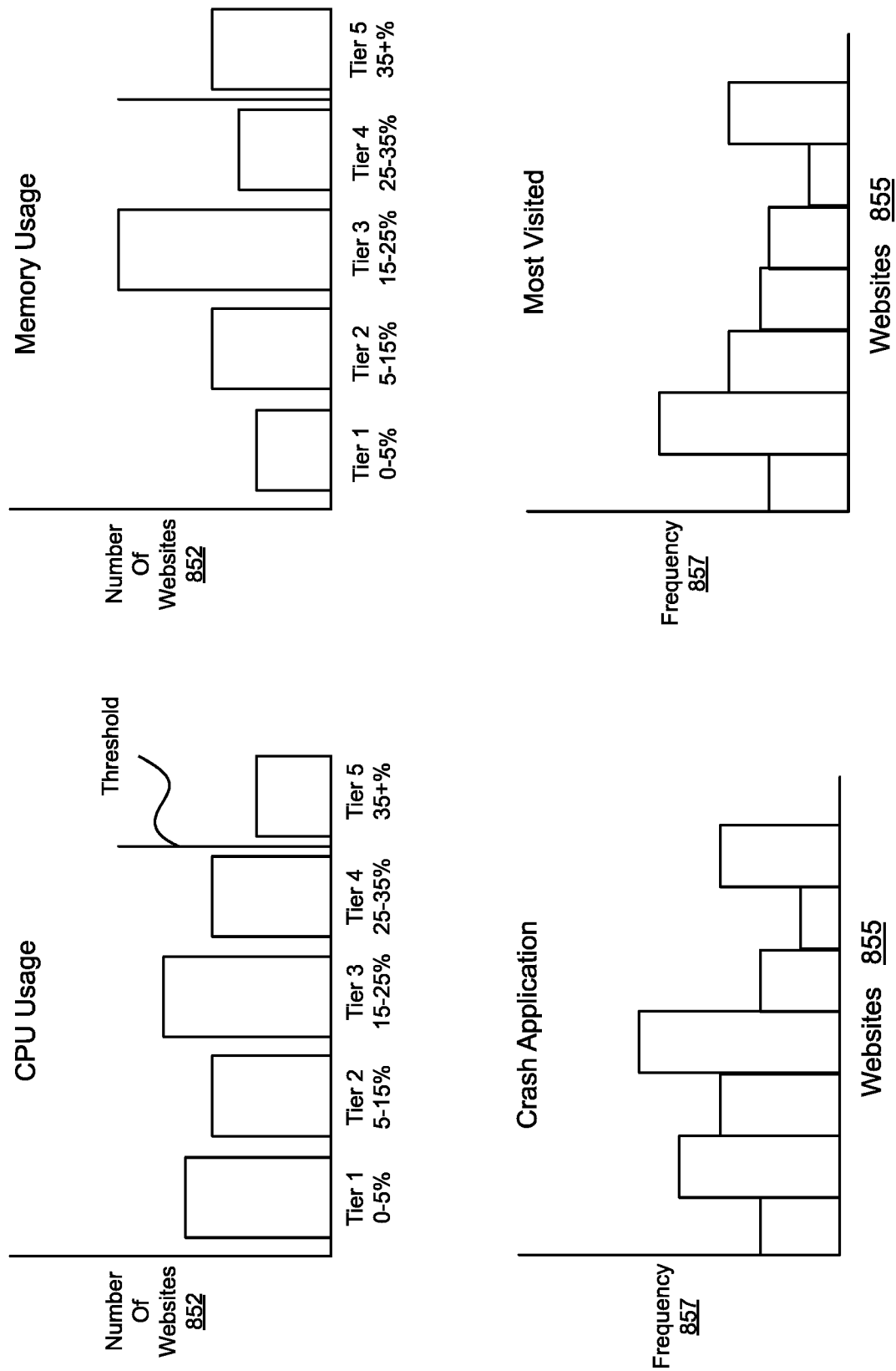
Figure 8F:
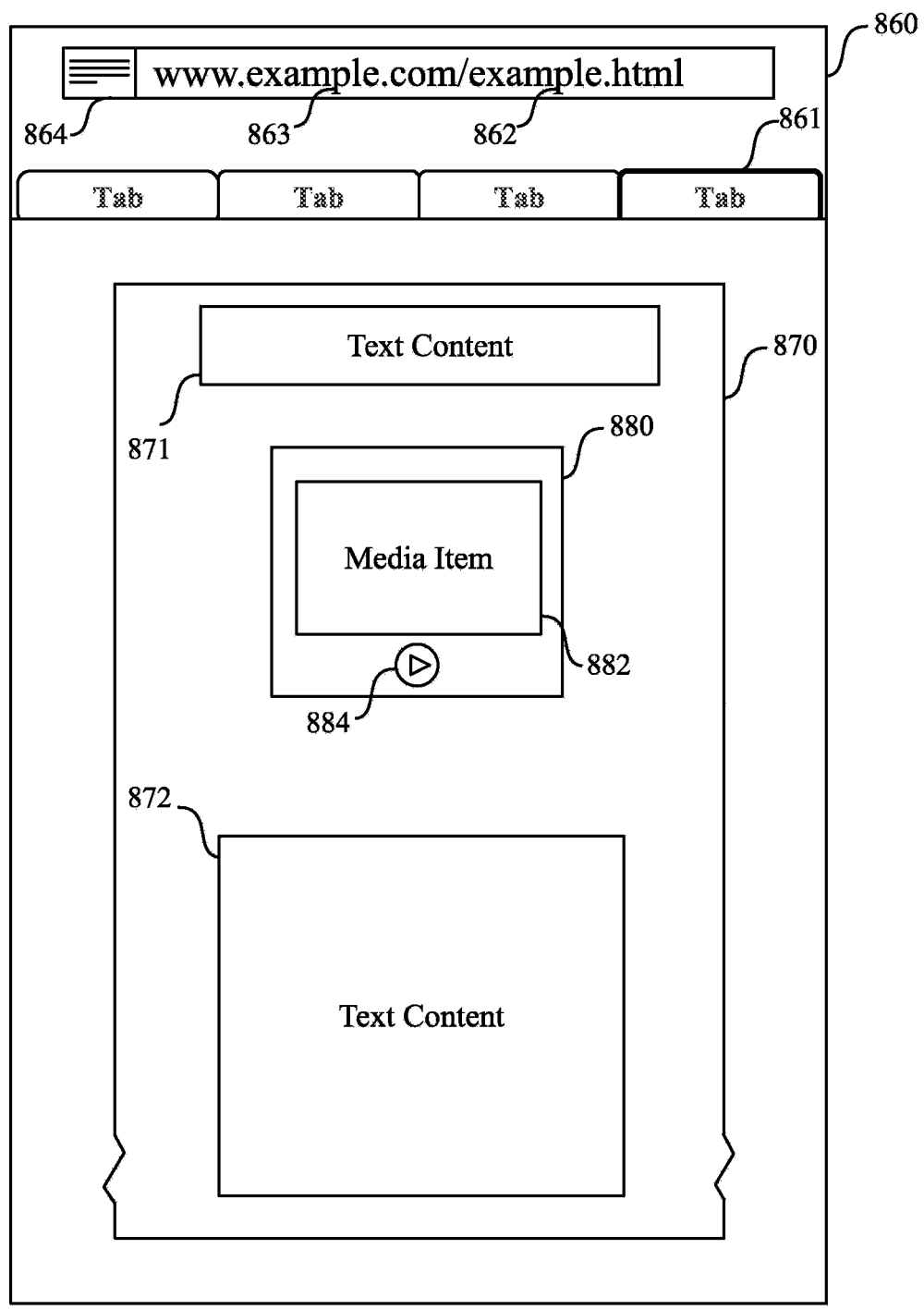

FIGS. 8A-8F are exemplary flow diagrams and illustrations regarding crowdsourcing user interaction and device resource consumption data, according to an embodiment. FIG. 8A is an example flow diagram illustrating crowdsourcing user interaction data according to an embodiment. FIG. 8B is an exemplary flow diagram illustrating a method of processing crowdsourced user interaction data according to an embodiment. FIG. 8C is an example flow diagram illustrating a method of crowdsourcing data based on resource consumption according to an embodiment. FIG. 8D is an exemplary flow diagram illustrating a method of processing crowdsourced data based on resource consumption according to an embodiment. FIG. 8E shows an exemplary diagram illustrating various usage and frequency information that may be derived from the crowdsourced resource consumption data according to an embodiment. FIG. 8F illustrates presentation of content for which crowdsourced data regarding user interaction and resource consumption can be collected, according to embodiments described herein.

FIG. 8A illustrates and exemplary process 800 that can use processing logic, which can include software, hardware, or a combination thereof. For example, the process 800 can be performed by client device 110 of system 100 as in FIG. 1.

In operation 801, the system can monitor a user interaction with an application, service, or domain. For example, the system can monitor a user interaction with a website (or web-application, application, service, etc.). The system can analyze various user interactions and determine (or infer) a preference of a user. For example, the system can determine (or infer) a preference to enable or disable auto-play media content with respect to particular websites. As another example, the system can determine a preference of display settings with respect to content. For example, system can infer a preference with respect to reader mode (e.g. a mode in which tools or menu items are not displayed, for example, to mimic reading of a book). In yet another example, the system can infer a preference for content blocking settings. For example, based on user interactions, the system can determine which types of elements (e.g. unsafe or malicious) within a website to block.

As described, in one embodiment, the system can monitor user actions in relation to a website initiating or attempting to initiate auto-play of media content. As referred to herein, auto-play relates to media content that is set (e.g. by code, script, or other logic associated with a website) to automatically commence playing without an explicit input from the user (e.g. selecting a play button). Moreover, auto-play can also occur in various circumstances. Typically, auto-play is initiated upon a user visiting a website, but it should be noted that auto-play can also be initiated in other instances, such as upon a user scrolling to a particular portion of a webpage, or upon when the media content is ready to play (e.g. buffered), etc. In addition, as referred to herein, media content can include various multimedia such as video (with or without audio) or audio, which can be in various formats. In one embodiment, media content can also include various add-ons or plug-ins such as Flash®. A website can initiate auto-play in response to particular events. As described, a website typically initiates auto-play when a website is visited (e.g. URL submitted). It should be noted, however, that in some instances, the media content can take a certain amount of time to load. Accordingly, in some instances the user may be able to browse the website (e.g. text portion) prior to the website initiating playback of the media content set to auto-play. In such instances, the system can monitor user interactions subsequent to (or in response to) the media content being ready (e.g. buffered) to commence playback.

In operation 802, the system can categorize the user interactions. In one embodiment, categorizing the user interactions includes associating a website or webpage into a category based on the user interactions. When monitoring user interactions in relation to auto-play of media content, the system can infer a preference for enabling auto-play. Accordingly, the system can monitor various user interactions that provide an indication for a user preferring to enable auto-play. For example, the user interaction can include allowing the auto-playing of media content to exceed a predetermined time value once presenting the media content to the user. As referred to herein, a time value can include a time interval (e.g. 10 seconds) or various other values such as percentage (e.g. viewing more than 50% of the length of the content item). As another example, the user interaction can include a user maximizing or enlarging media content within a time value of visiting the webpage. As another example, the user interaction can include playing a video within a certain time value of visiting a webpage. For instance, a user immediately wanting to play a video can provide an indication that the user may have a preference for enabling auto-play on that particular website.

In addition, the user action can include choosing to play a video in which auto-play was disabled (e.g. via a default system setting or preference). In one embodiment, this can include choosing to play the video in which auto-play was disabled within a predetermined time value of visiting the webpage. It should be noted that the user interactions herein can be collected in an environment in which the system may automatically adjust parameters of auto-play. For example, the system can implement user preferences for enabling or disabling auto-play. As another example, the system may adjust one or more parameters such as volume, mute, size, or delaying the presentation of media content that is set to auto-play. Further non-limiting examples of setting auto-play preferences from aggregated data can be found in commonly assigned U.S. Patent Application No. 62/506,685, titled "Device, method, and graphical user interface for managing website presentation settings," filed May 16, 2017, the entirety of which is incorporated herein by reference.

The system can also monitor various user interactions that provide an indication for a user preferring to disable auto-play. For example, the user action can include interrupting the auto-play of the media content within a predetermined time value of presenting the media content to the user. For instance, interrupting auto-play may include stopping or pausing the media content, as well as muting, or lowering the volume to a certain level (e.g. below a threshold as a percentage or value). As another example, the user interaction may include closing or minimizing an application or a tab associated with the webpage. In addition, the user interaction can include performing system functions such as enabling a system mute or lowering the system volume. As another example, in instances where auto-play is disabled, the user interaction can include navigating (e.g. scrolling) away from a content item that is set to auto-play without choosing to play the media content.

In addition, user interactions can include various interactions that may be monitored with one or more sensors of a device. For example, various sensors on the device may monitor user engagement or disengagement. For instance, the user being within proximity to the device and actively interacting with the device can infer the degree of engagement. Conversely, the user looking away from the device or moving away from the device can infer a degree of disengagement. Accordingly, one or more sensors of the device can be leveraged to determine or infer a behavior of a user.

In addition, it should be noted that other categories in addition to those discussed above may also be used. For example, categories that provide a degree of preference (e.g. very strong, strong, weak, very weak), or any other categorization technique may also be used.

Once the user interaction data is collected, it can be sent to a server for analysis. As described herein, the system can ensure user privacy by implementing a differential privacy mechanism. In addition, to further protect the privacy of users, only a sampling of data can be sent to the server.

Accordingly, in 803 the system can privatize an encoding of an entity associated with the user interaction (e.g. a webpage or a website associated with the webpage) and a user interaction category (e.g. preference for enabling auto-play, or preference for disabling auto-play). The encoding can utilize any one of the encoding techniques described herein, and can use one of various privatization techniques to mask individual contributors of the data. In one embodiment, the encoding is differentially privatized using techniques described herein.

In 804, the system can transmit the differentially privatized encoding to a server for estimation of a frequency of the categorization of the entity amongst crowdsourced data. As described above, the server can perform various operations (e.g. a count-mean-sketch) to determine frequency estimations. The server can determine frequency estimations based on the categorization scheme. For example, a frequency estimation in which users have a preference for enabling auto-play for particular webpage or website can be determined, as well as the frequency estimation in which users have a preference for disabling for auto-play for the webpage or website.

FIG. 8B is an exemplary flow diagram illustrating a process 810 of processing crowdsourced user interaction data according to an embodiment of the disclosure. Process 810 can use processing logic, which may include software, hardware, or a combination thereof. For example, process 810 can be performed by a server (e.g., server 130) as described herein.

In operation 811, the system can receive, from each of a set of client devices, a privatized encoding of a representation of an entity and an associated category. The entity can be a webpage or a website associated with the webpage. In one embodiment, the entity can be a webpage and the representation (e.g., URL) identifies a website or domain associated with the webpage. In one embodiment, the category can relate to inferring a user preference of enabling or disabling auto-play of media content on a webpage of the website. In one embodiment, the privatized encoding can be of an identifier or locator for the website. In one embodiment, the interaction data can be related to an application, including a web application, where a web application is a website hosted application coded in a language such as Java or JavaScript, or an HTML5 based application that may be loaded as a webpage.

In operation 812, the system can accumulate frequency estimations of the privatized encodings received from the set of client devices. For example, the system can use a sketch such as the frequency table shown in FIG. 4.

In operation 813, the system can estimate a frequency of a selected entity being associated with the category amongst the frequencies included in the sketch. For example, as described above, the system can determine the frequency using a count-mean-sketch operation.

In some embodiments, the system can also add or remove particular entity (e.g., webpage, website) from a whitelist based on the determined frequencies, as shown by operation 814. For example, a website with a high percentage of users inferring a preference to enable auto-play (e.g. more than 90%) can be added to the whitelist. Similarly, a website in which the percentage of users (e.g. more than 50%) indicate a preference for disabling auto-play can be removed from the whitelist (or added to a blacklist).

As described above, in another aspect of the disclosure, a user experience can be enhanced by identifying particular websites that exhibit particular characteristics. In one embodiment, websites that are associated with a high resource consumption may be identified. For example, high resource consumption can be identified based on threshold of particular resources such as CPU, memory, and power usage. By identifying such websites, developers can ascertain which websites may be problematic or potential candidates for development efforts.

FIG. 8C is an exemplary flow diagram illustrating a process 820 of crowdsourcing data based on resource consumption, according to an embodiment. Process 820 can use processing logic, which may include software, hardware, or a combination thereof. For example, process 820 can be performed by a client device 110 as described herein.

In operation 821, the system can monitor a resource consumption associated with an application. The application can be a native application executing on the client device or can be a web application executing on a website. The application can also be a plugin application that executes based on content on a website and the system can monitor resources consumed while the device is browsing the website. In one embodiment, the resource consumption can include one or more of a processor (e.g., CPU, graphics processor, etc.) usage, memory usage, power usage, or transmission bandwidth usage. It is contemplated, however, that any other usage or statistical information can be monitored.

In operation 822, the system can determine the resource consumption exceeds a threshold. For example, a resource threshold can be exceeded if a certain percentage of the CPU (e.g. more than 20%) is utilized by a particular process or application, or a process or application associated with a website.

In operation 823, the system can privatize an encoding of an identifier of the application and, in one embodiment, one or more usage categories, using any of the encoding methods described herein. In the case of a web application, plugin, or another web related application, the identifier can include a name or URL of a website or webpage. The system can privatize the encoding using differential privacy techniques described herein, although other privatization and/or anonymization techniques can be used.

In operation 824, the system can transmit the differentially privatized encoding to a server. As described above, the server can perform various operations (e.g. a count-mean-sketch) to determine frequency estimations. For example, the server can determine a frequency of applications and/or websites that exceed a particular threshold. In another example, the server can determine a frequency of applications and/or websites that fall within particular threshold ranges or buckets as shown in FIG. 8E.

FIG. 8D is an exemplary flow diagram illustrating a process 840 of processing crowdsourced data based on resource consumption according to an embodiment of the disclosure. Process 840 can use processing logic, which may include software, hardware, or a combination thereof. For example, process 840 can be performed by a server 130 as in system 100 of FIG. 1.

In 841, the system can receive, from each of a set of client devices, a privatized encoding of an identifier for an application or website. Each application or website is selected for transmittal in response to exceeding the resource consumption threshold. The identifier can be an application name, a website, or an application name and website.

In 842, the system can accumulate frequency estimations for the privatized encodings received from the set of client devices. The frequency estimations can include a sketch, such as frequency table as shown in FIG. 4.

In 843, the system can estimate a frequency of exceeding a particular threshold for a selected application, website, or webpage of a website. For example, as described above, the system can determine the frequency using a count-mean-sketch operation.

In some embodiments, the system in 844, can also adjust a resource consumption threshold based on an analysis of resource consumption usage patterns. For example, the system can determine the percentage of websites that exceed a predetermined threshold has increased over a span of time (e.g. months). Accordingly, the predetermined threshold that triggers an indication of high resource consumption can be adjusted (e.g. increased) dynamically based on the continued analysis of crowdsourced data.

FIG. 8E shows an exemplary diagram illustrating various usage and frequency information that may be derived from the crowdsourced resource consumption data according to an embodiment. For example, as shown, a number websites 852 within particular tiers of CPU usage and memory usage can be determined. In addition, a number websites exceeding a particular threshold can also be determined as shown. As another example, the frequency 857 of website 855 exhibiting particular characteristics can also be determined. For example, the frequency in which particular websites may crash an application can be monitored, as well as the frequency of visits for the most popular websites may be tracked. It should be noted that these examples are merely illustrative and countless other metrics may be used according to the particular application.

FIG. 8F illustrates presentation of content for which crowdsourced data regarding user interaction and resource consumption can be collected, according to embodiments described herein. As illustrated an application 860 can execute on a data processing system or electronic device described herein, such as the client devices 110 of FIG. 1. The application 860 can be one of the applications 230A-230C of FIG. 2, and can produce user data that can be privatized and submitted as privatized crowdsourced data. In one embodiment the application 860 is a web browser application, but can be any application executing on an electronic device or data processing system, including a mobile application executing on a mobile, handheld, or wearable electronic device. In one embodiment the application 860 generates user data with respect to a user interaction with the application with respect to content presented by the application. In one embodiment the application 860 generates data with respect to resource consumption of the application, for example while the application is presenting content, such as a webpage or web application.

Where the application 860 is a web browser, the application can be used to navigated to a website hosted on a network, such as the Internet. The application 860 can display multiple tabs 861, each tab presenting the same or different content 870. The content 870 can be presented from a webpage (e.g., example.html 826) hosted on a website (e.g., www.example.com 863). The webpage 862 can be one of several webpages on a website, and the website 863 can be one of several websites hosted on a domain (e.g., example.com). The webpage 862, website 863, or domain name can be included in representations of a user data that is privatized and transmitted to crowdsourcing server. The content 870 can include various types of content items, including text content 871, 872, and media content 880. The media content 880 can present a media item 882 as a content item, as well as a media control 884 to initiate, pause, or stop playback of the media item 882. For example, if auto-playback is enabled for the media item 882, a user can use the media control 884 to pause playback of the media item. The user can also use the media control 882 to initiate playback of a media item that is set to auto-play, but auto-play is prevented due to display settings for the content 870. The application 860 can include settings that can configure the display of content 870. For example, an application 860 can include a user interface element 864 to enable a reader mode setting 864 as described herein. The reader mode setting can be used to limit the presentation of the content 870 to only certain text content 871, 822. Additionally, the application 860 may provide the user with the option to block specific elements of the content 870.

In one embodiment, privatized crowdsourced data is collected based on a detected interaction in relation to a content item (e.g., media item 882) of presented content 870. Based on the interaction, the presented content 870 can be associated with a category based on the interaction. The category can be selected from a set of categories related to an inferred preference for presentation of the presented content. For example, the application 860 can include various settings that control how the content 870 is presented. The interaction can be used to place the content 870 into a category that is associated with an inferred setting. For example, based on the interaction, the content 870 can be associated with a category related to an inferred preference to allow auto-play of the media item 882. The content 870 can also be associated with a category related to an inferred preference to prevent auto-play of the media item 882. In one embodiment the content can be associated with an inferred preference to enter the reader mode. In one embodiment the content can be associated with an inferred preference to prevent display of certain content items. A privatized encoding can be created on a client device that includes a representation of the presented content 870 and a representation of the category to which the presented content is associated. The privatized encoding can then be transmitted to a server, which can accumulate a privatized encoding from multiple devices to estimate a frequency of the presented content being associated with a specific category. The privatized data with respect to user interaction with content can be used to crowdsource a variety of display or presentation settings associated with content. Categories can be determined with respect to user preferences for zoom settings, brightness settings, or any application or device setting. In one embodiment, a set of desired layouts for user interface elements or content items can be determined based on crowdsourcing data on user interaction with user interface elements and content items.

It should be noted that the sampling of data described herein are examples, and accordingly, it is contemplated that any type of data can be sampled (e.g. collected) in a differentially private manner to determine various frequencies or statistics. For example, the above methods may be equally applicable to various user information or user interactions that may occur with various components of a system, or applications, or services.

Accordingly, as described above, the mechanisms of the disclosure leverage the potential of crowdsourced data while maintaining user privacy (e.g., via a local differential privacy mechanism) to potentially gain valuable insights for development efforts.

Exemplary Application Programming Interface Diagrams

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 9:
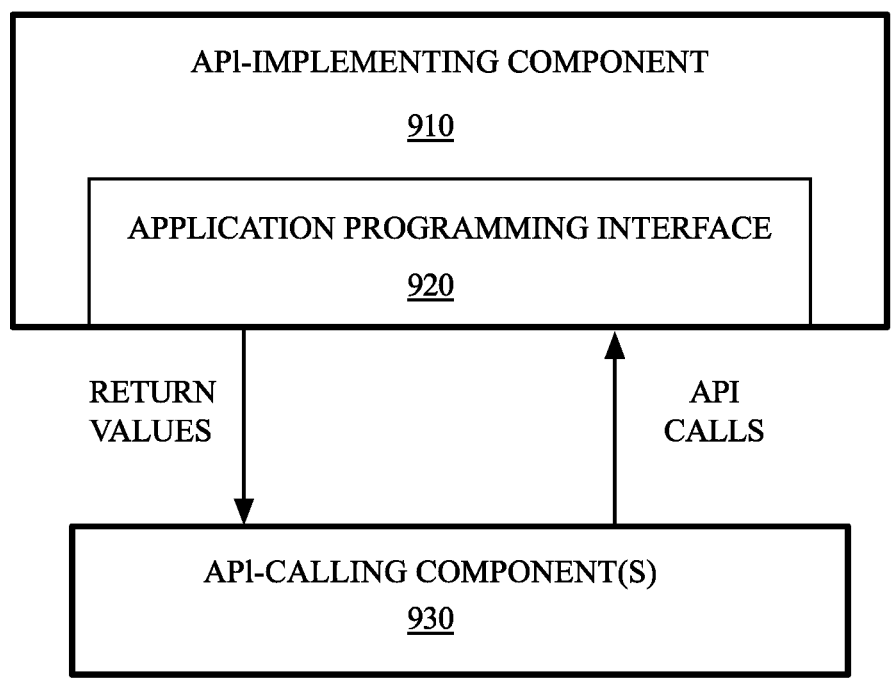
FIG. 9 is a block diagram illustrating an exemplary API architecture, which may be used in some embodiments.

FIG. 9 is a block diagram illustrating an exemplary API architecture, which may be used in some embodiments described herein. The API architecture 900 includes the API-implementing component 910 (e.g., an operating system, a library, a device driver, an API, an application program, software or other module) that implements the API 920. The API 920 specifies one or more functions, methods, classes, objects, protocols, data structures, formats and/or other features of the API-implementing component that may be used by the API-calling component 930. The API 920 can specify at least one calling convention that specifies how a function in the API-implementing component receives parameters from the API-calling component and how the function returns a result to the API-calling component. The API-calling component 930 (e.g., an operating system, a library, a device driver, an API, an application program, software or other module), makes API calls through the API 920 to access and use the features of the API-implementing component 910 that are specified by the API 920. The API-implementing component 910 may return a value through the API 920 to the API-calling component 930 in response to an API call.

It will be appreciated that the API-implementing component 910 may include additional functions, methods, classes, data structures, and/or other features that are not specified through the API 920 and are not available to the API-calling component 930. It should be understood that the API-calling component 930 may be on the same system as the API-implementing component 910 or may be located remotely and accesses the API-implementing component 910 using the API 920 over a network. While FIG. 9 illustrates a single API-calling component 930 interacting with the API 920, it should be understood that other API-calling components, which may be written in different languages (or the same language) than the API-calling component 930, may use the API 920.

The API-implementing component 910, the API 920, and the API-calling component 930 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 10A:
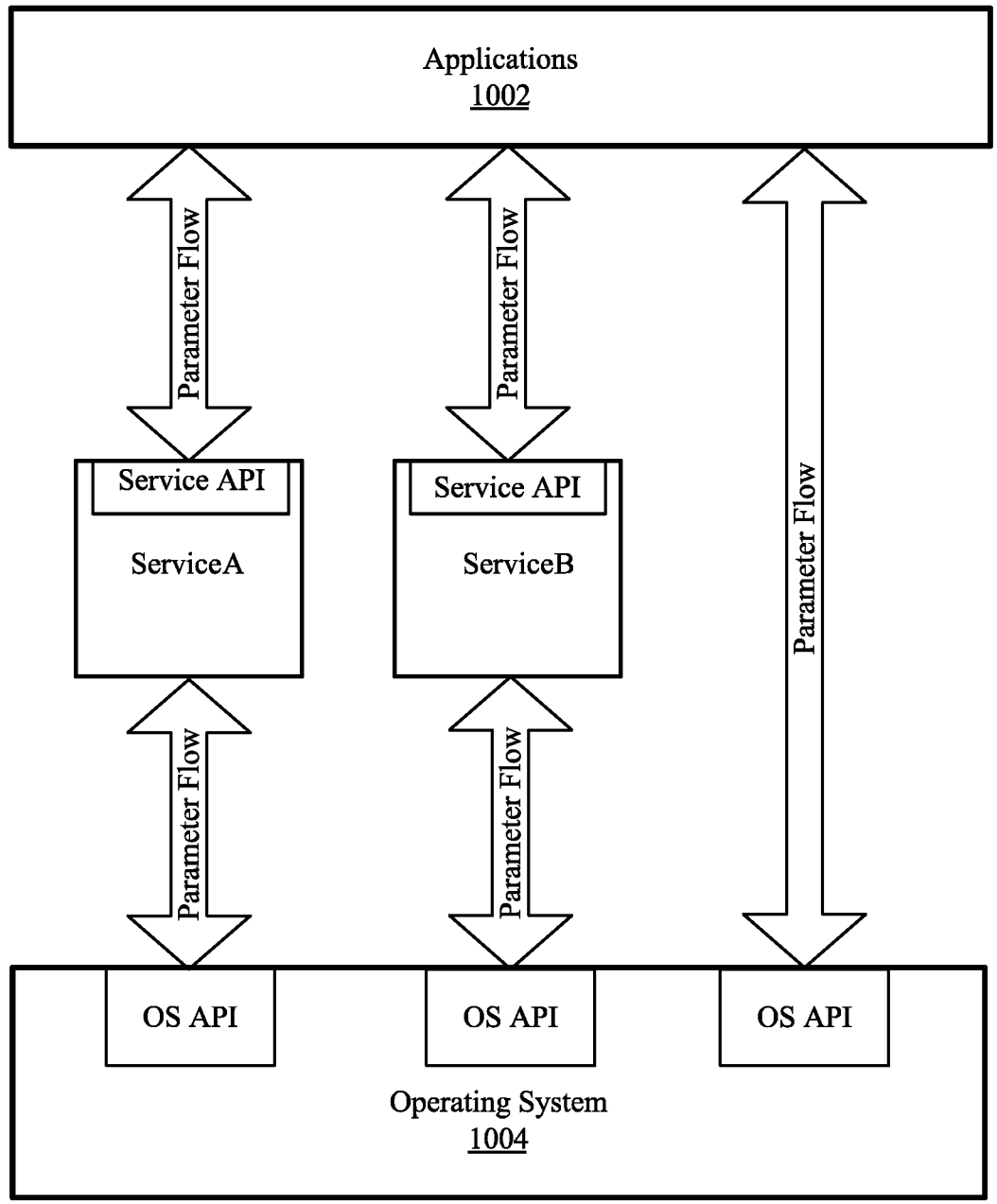
FIG. 10A-10B are block diagrams of exemplary API software stacks, according to embodiments.
Figure 10B:
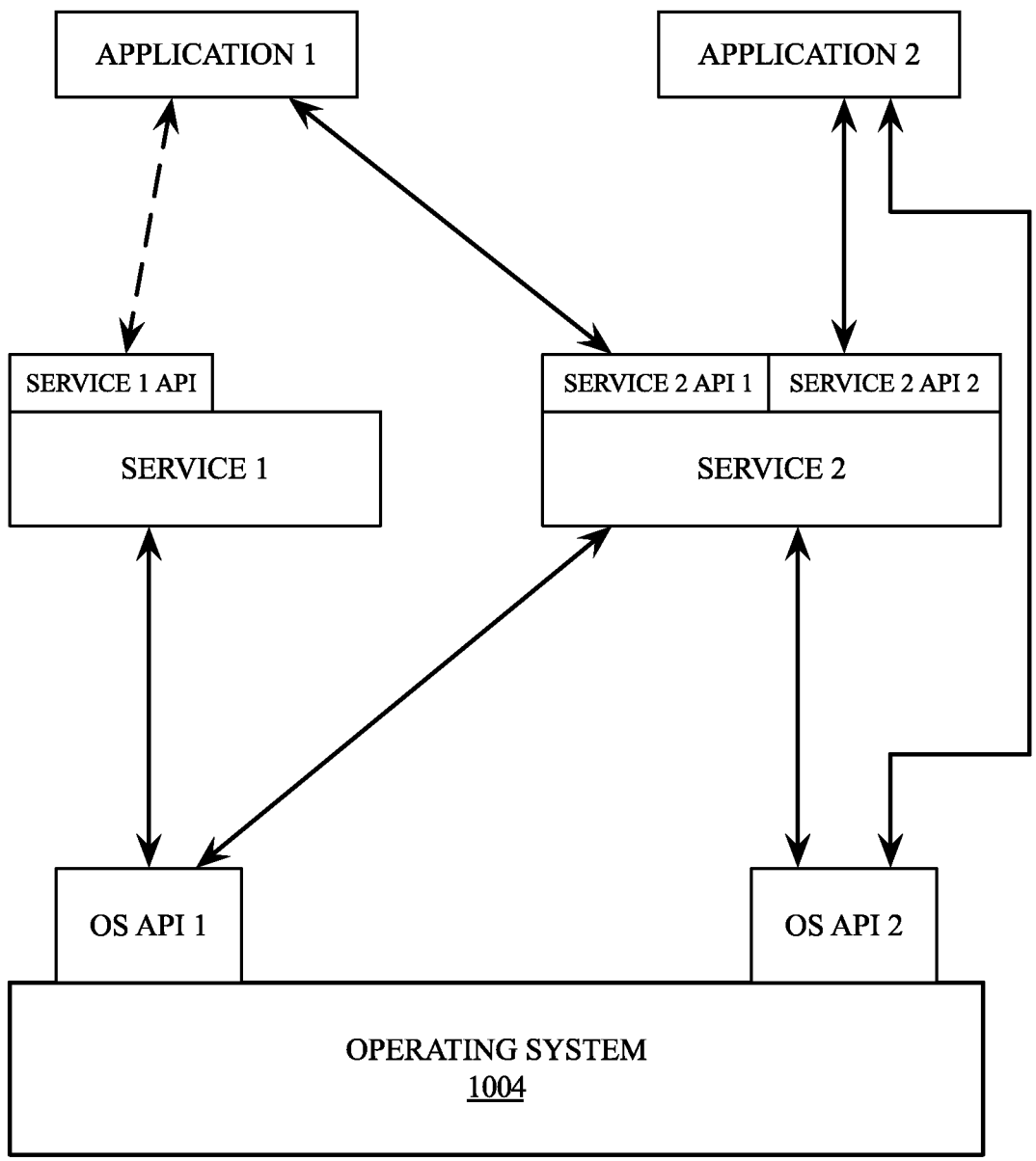

FIGS. 10A-10B are block diagrams of exemplary API software stacks 1000, 1010, according to embodiments. FIG. 10A shows an exemplary API software stack 1000 in which applications 1002 can make calls to Service A or Service B using Service API and to Operating System 1004 using an OS API. Additionally, Service A and Service B can make calls to Operating System 1004 using several OS APIs.

FIG. 10B shows an exemplary software stack 1010 including Application 1, Application 2, Service 1, Service 2, and Operating System 1004. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Additional Exemplary Computing Devices

Figure 11:
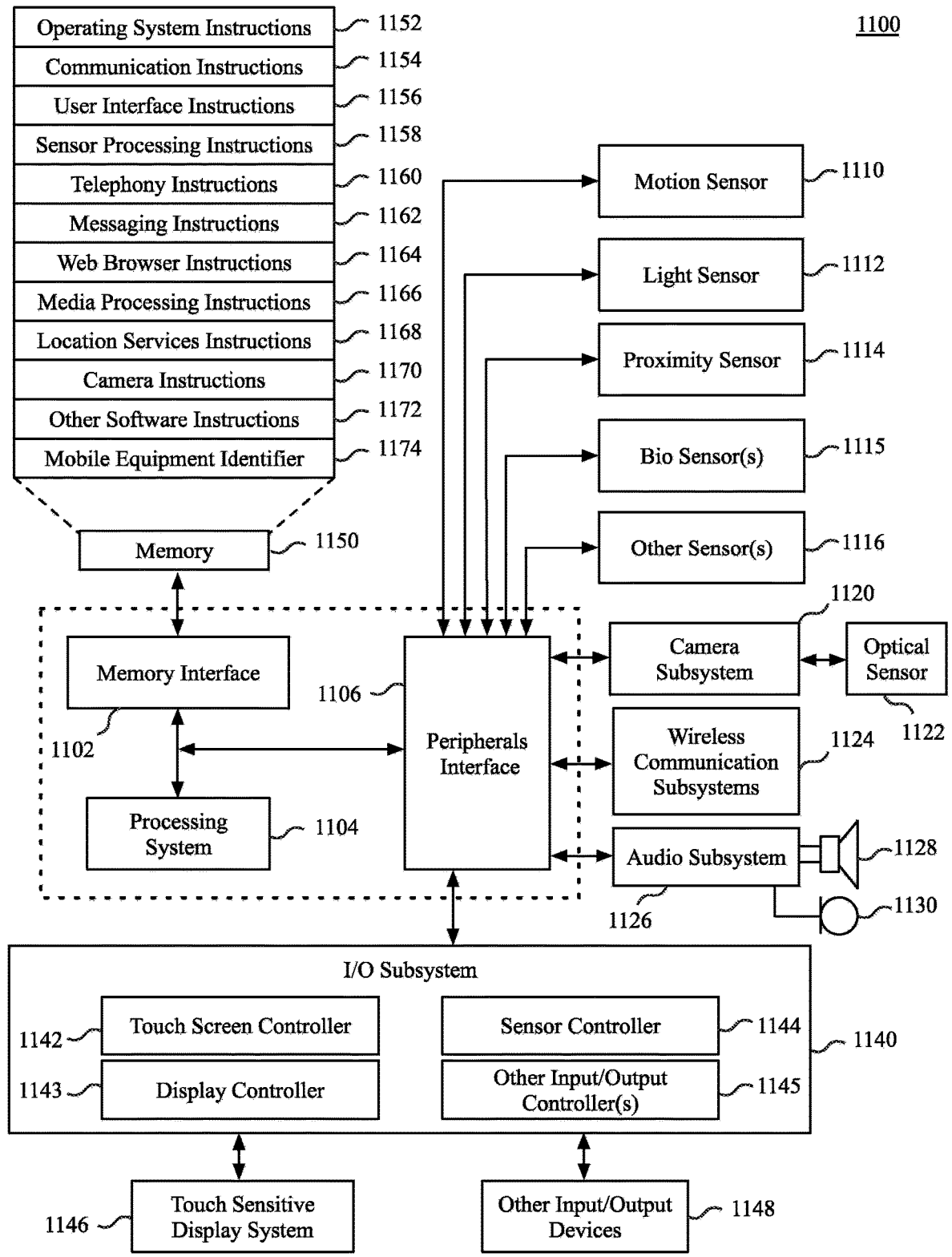
FIG. 11 is a block diagram of mobile device architecture, according to an embodiment.

FIG. 11 is a block diagram of a device architecture 1100 for a mobile or embedded device, according to an embodiment. The device architecture 1100 includes a memory interface 1102, a processing system 1104 including one or more data processors, image processors and/or graphics processing units, and a peripherals interface 1106. The various components can be coupled by one or more communication buses or signal lines. The various components can be separate logical components or devices or can be integrated in one or more integrated circuits, such as in a system on a chip integrated circuit.

The memory interface 1102 can be coupled to memory 1150, which can include high-speed random access memory such as static random access memory (SRAM) or dynamic random access memory (DRAM) and/or non-volatile memory, such as but not limited to flash memory (e.g., NAND flash, NOR flash, etc.).

Sensors, devices, and subsystems can be coupled to the peripherals interface 1106 to facilitate multiple functionalities. For example, a motion sensor 1110, a light sensor 1112, and a proximity sensor 1114 can be coupled to the peripherals interface 1106 to facilitate the mobile device functionality. One or more biometric sensor(s) 1115 may also be present, such as a fingerprint scanner for fingerprint recognition or an image sensor for facial recognition. Other sensors 1116 can also be connected to the peripherals interface 1106, such as a positioning system (e.g., GPS receiver), a temperature sensor, or other sensing device, to facilitate related functionalities. A camera subsystem 1120 and an optical sensor 1122, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1124, which can include radio frequency receivers and transmitters and/or optical (e.g., infrared) receivers and transmitters. The specific design and implementation of the wireless communication subsystems 1124 can depend on the communication network(s) over which a mobile device is intended to operate. For example, a mobile device including the illustrated device architecture 1100 can include wireless communication subsystems 1124 designed to operate over a GSM network, a CDMA network, an LTE network, a Wi-Fi network, a Bluetooth network, or any other wireless network. In particular, the wireless communication subsystems 1124 can provide a communications mechanism over which a media playback application can retrieve resources from a remote media server or scheduled events from a remote calendar or event server.

An audio subsystem 1126 can be coupled to a speaker 1128 and a microphone 1130 to facilitate voice-enabled functions, such as voice recognition, voice replication, digital recording, and telephony functions. In smart media devices described herein, the audio subsystem 1126 can be a high-quality audio system including support for virtual surround sound.

The I/O subsystem 1140 can include a touch screen controller 1142 and/or other input controller(s) 1145. For computing devices including a display device, the touch screen controller 1142 can be coupled to a touch sensitive display system 1146 (e.g., touch-screen). The touch sensitive display system 1146 and touch screen controller 1142 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1146. Display output for the touch sensitive display system 1146 can be generated by a display controller 1143. In one embodiment the display controller 1143 can provide frame data to the touch sensitive display system 1146 at a variable frame rate.

In one embodiment a sensor controller 1144 is included to monitor, control, and/or processes data received from one or more of the motion sensor 1110, light sensor 1112, proximity sensor 1114, or other sensors 1116. The sensor controller 1144 can include logic to interpret sensor data to determine the occurrence of one of more motion events or activities by analysis of the sensor data from the sensors.

In one embodiment the I/O subsystem 1140 includes other input controller(s) 1145 that can be coupled to other input/control devices 1148, such as one or more buttons, rocker switches, thumb-wheel, infrared port, USB port, and/or a pointer device such as a stylus, or control devices such as an up/down button for volume control of the speaker 1128 and/or the microphone 1130.

In one embodiment, the memory 1150 coupled to the memory interface 1102 can store instructions for an operating system 1152, including portable operating system interface (POSIX) compliant and non-compliant operating system or an embedded operating system. The operating system 1152 may include instructions for handling basic system services and for performing hardware dependent tasks. In some implementations, the operating system 1152 can be a kernel.

The memory 1150 can also store communication instructions 1154 to facilitate communicating with one or more additional devices, one or more computers and/or one or more servers, for example, to retrieve web resources from remote web servers. The memory 1150 can also include user interface instructions 1156, including graphical user interface instructions to facilitate graphic user interface processing.

Additionally, the memory 1150 can store sensor processing instructions 1158 to facilitate sensor-related processing and functions; telephony instructions 1160 to facilitate telephone-related processes and functions; messaging instructions 1162 to facilitate electronic-messaging related processes and functions; web browser instructions 1164 to facilitate web browsing-related processes and functions; media processing instructions 1166 to facilitate media processing-related processes and functions; location services instructions including GPS and/or navigation instructions 1168 and Wi-Fi based location instructions to facilitate location based functionality; camera instructions 1170 to facilitate camera-related processes and functions; and/or other software instructions 1172 to facilitate other processes and functions, e.g., security processes and functions, and processes and functions related to the systems. The memory 1150 may also store other software instructions such as web video instructions to facilitate web video-related processes and functions; and/or web shopping instructions to facilitate web shopping-related processes and functions. In some implementations, the media processing instructions 1166 are divided into audio processing instructions and video processing instructions to facilitate audio processing-related processes and functions and video processing-related processes and functions, respectively. A mobile equipment identifier, such as an International Mobile Equipment Identity (IMEI) 1174 or a similar hardware identifier can also be stored in memory 1150.

Each of the above identified instructions and applications can correspond to a set of instructions for performing one or more functions described above. These instructions need not be implemented as separate software programs, procedures, or modules. The memory 1150 can include additional instructions or fewer instructions. Furthermore, various functions may be implemented in hardware and/or in software, including in one or more signal processing and/or application specific integrated circuits.

Figure 12:
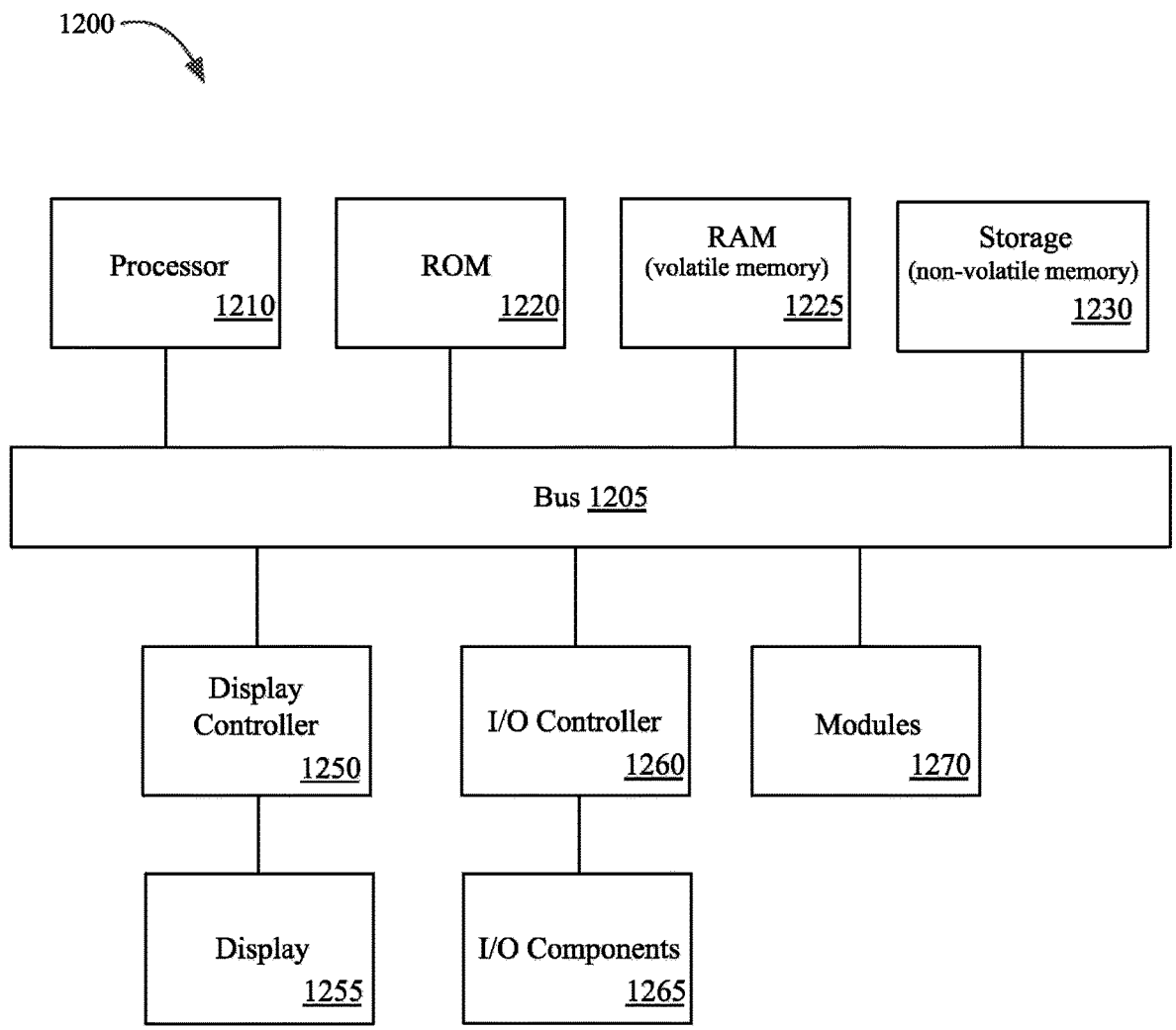
FIG. 12 is a block diagram illustrating an example computing system that can be used in conjunction with one or more of the embodiments of the disclosure.

FIG. 12 is a block diagram illustrating a computing system 1200 that can be used in conjunction with one or more of the embodiments described herein. The illustrated computing system 1200 can represent any of the devices or systems (e.g. client device 110, server 130) described herein that perform any of the processes, operations, or methods of the disclosure. Note that while the computing system illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 1200 can include a bus 1205 which can be coupled to a processor 1210, ROM (Read Only Memory) 1220, RAM (or volatile memory) 1225, and storage (or non-volatile memory) 1230. The processor 1210 can retrieve stored instructions from one or more of the memories 1220, 1225, and 1230 and execute the instructions to perform processes, operations, or methods described herein. These memories represent examples of a non-transitory machine-readable medium (or computer-readable medium) or storage containing instructions which when executed by a computing system (or a processor), cause the computing system (or processor) to perform operations, processes, or methods described herein. The RAM 1225 can be implemented as, for example, dynamic RAM (DRAM), or other types of memory that require power continually in order to refresh or maintain the data in the memory. Storage 1230 can include, for example, magnetic, semiconductor, tape, optical, removable, non-removable, and other types of storage that maintain data even after power is removed from the system. It should be appreciated that storage 1230 can be remote from the system (e.g. accessible via a network).

A display controller 1250 can be coupled to the bus 1205 in order to receive display data to be displayed on a display device 1255, which can display any one of the user interface features or embodiments described herein and can be a local or a remote display device. The computing system 1200 can also include one or more input/output (I/O) components 1265 including mice, keyboards, touch screen, network interfaces, printers, speakers, and other devices. Typically, the input/output components 1265 are coupled to the system through an input/output controller 1260.

Modules 1270 (or components, units, functions, or logic) can represent any of the functions or engines described above, such as, for example, the differential privacy engine 228. Modules 1270 can reside, completely or at least partially, within the memories described above, or within a processor during execution thereof by the computing system. In addition, modules 1270 can be implemented as software, firmware, or functional circuitry within the computing system, or as combinations thereof.

In some embodiments, the hash functions described herein (e.g. SHA256) can utilize specialized hardware circuitry (or firmware) of the system (client device or server). For example, the function can be a hardware-accelerated function. In addition, in some embodiments, the system can use a function that is part of a specialized instruction set. For example, the can use an instruction set which may be an extension to an instruction set architecture for particular a type of microprocessors. Accordingly, in an embodiment, the system can provide a hardware-accelerated mechanism for performing SHA operations. Accordingly, the system can improve the speed of performing the functions described herein using these instruction sets.

In addition, the hardware-accelerated engines/functions are contemplated to include any implementations in hardware, firmware, or combination thereof, including various configurations which can include hardware/firmware integrated into the SoC as a separate processor, or included as special purpose CPU (or core), or integrated in a coprocessor on the circuit board, or contained on a chip of an extension circuit board, etc.

Accordingly, although such accelerated functions are not necessarily required to implement differential privacy, some embodiments herein, can leverage the prevalence of specialized support for such functions (e.g. cryptographic functions) to potentially improve the overall efficiency of implementations.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally various components described herein can be a means for performing the operations or functions described herein.

In one aspect of the disclosure, described is a system (and method) that ensures differential privacy when transmitting data to a server that estimates a frequency of such data amongst a set of client devices. The differential privacy may reduce resource requirements while still providing provable guarantees regarding privacy and utility. For instance, the mechanism may provide the ability to tailor utility (e.g. accuracy of estimations) against the resource requirements (e.g. transmission bandwidth and computation complexity). In order to account for the reduced resource requirements (e.g. reduced bit lengths of encodings), the mechanism may estimate frequencies of data using a count-mean-sketch as further described herein.

With respect to resource requirements, the mechanism may implement a hashing function that provides for the ability to reduce computational requirements by using only a portion of a generated hash value. In order to avoid hash collisions from using only a portion of the hash value, the mechanism may use variants when hashing user data. The use of variants allows the mechanism to implement shared hashing to reduce the number of required computations that must be performed by a client and the server. With respect to utility, the mechanism provides frequency estimations within a predictable deviation that includes a lower bound and an upper bound.

In another aspect of disclosure, described is a system and method that uses a privacy mechanism described herein to collect crowdsourced data to enhance a user experience. For example, a user experience may be enhanced by inferring potential user preferences from analyzing crowdsourced user interaction data. Based on a statistical analysis of user interactions in relation to various features or events, development efforts with respect to application behavior may be refined or enhanced. The privatization techniques used to privatize crowdsourced user data are not limited to differential privacy techniques. For example, secure multi-party computation and/or homomorphic encryption can be employed to enable privatization of crowdsourced data.

In one embodiment, user interactions in relation to the presentation of content such as content from online sources may be analyzed. For example, presentation settings or preferences may be defined based on the crowdsourced user interaction data.

In one embodiment, presentation settings may include auto-play settings for media content, enabling crowdsourced data in relation to the auto-play of media content may be analyzed. For example, the system may determine or infer a crowdsourced preference to enable or disable auto-play media content with respect to particular websites. A user interaction that includes immediately stopping or muting an auto-playing media item upon visiting a website may be deemed to infer a preference for disabling auto-play. Conversely, upon visiting a webpage in which auto-play of media content is disabled (e.g. via a default system setting or preference), and the user chooses to play the media content in which auto-play was disabled, it can be inferred that the user has a preference to enable auto-play on such a website. Accordingly, collecting such user interaction data from various devices and analyzing the data on a server (e.g., via a local differential privacy mechanism) allows developers to potentially gain valuable insights on particular websites. For example, websites that have a high estimated frequency of users providing an inference of a preference to enable auto-play may be added to a "whitelist" (e.g. a list of websites in which auto-play feature is allowed or enabled).

In addition, other settings that relate to the presentation of content may also be analyzed. For example, additional presentation settings such as content display settings (e.g. a reader mode setting), or content blocking settings may also be analyzed with the differential privacy mechanism described herein.

In another aspect, a user experience may also be enhanced by identifying particular websites that exhibit particular characteristics. In one embodiment, websites that are associated with a high resource consumption may be identified. For example, high resource consumption may be identified based on threshold for a resource such as CPU, memory, and power usage. By identifying such websites, developers may ascertain which websites may be problematic or potential candidates for analysis to identify causes of the high resource consumption.

In the foregoing specification, privacy techniques have been described. It will, however, be evident that various modifications and changes can be made thereto without departing from the broader spirit and scope of the invention. The specification and drawings are, accordingly, to be regarded in an illustrative rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described in accordance with an embodiment. Accordingly, the true scope of the embodiments will become apparent to the skilled practitioner upon a study of the drawings, specification, and following claims.

What is claimed is:

1. A machine-readable medium storing instructions which, when executed by one or more processors of a computing device, cause the computing device to perform operations comprising:
   selecting a value of user data to transmit to a server from a set of possible user data values collected on a client device;
   creating a hash of a term for the value of user data using a random hash function, wherein the random hash function is generated from a randomly selected variant of the term, and wherein a set of possible variants of the term is indexed;
   encoding at least a portion of the hash of the term for the value as a vector, wherein the encoding includes updating a value of the vector at a position corresponding to the hash;
   privatizing the vector by changing at least some of the values of the vector with a predefined probability; and
   transmitting, to the server, the privatized vector and an index value of the randomly selected variant to enable the server to estimate of a frequency of the value of user data on a set of client devices.

2. The machine-readable medium of claim 1, wherein:
   the term is a string of characters and the randomly selected variant of the term includes one or more characters representing the index value of the variant appended to the string;
   the server estimates the frequency of the value of user data by updating a frequency table indexed by the set of possible variants and a row or column of the frequency table corresponding to the index value of the random hash function is updated with the privatized vector; and
   the server estimates a frequency of each of the set of possible user data values amongst from data accumulated from the set of client devices.

3. The machine-readable medium of claim 1, wherein the encoding includes initializing the vector with a uniform value and sign and updating the value of the vector includes flipping the sign of the value at the position corresponding to a created hash value.

4. The machine-readable medium of claim 3, wherein initializing the vector includes setting each value of the vector to a value representing a constant and updating the value of the vector includes setting the value at the position corresponding to a created hash value to a value representing a sign flip of the constant.

5. The machine-readable medium of claim 1, wherein the random hash function is to address hash collisions when using only the portion of a created hash value and to reduce a number of computations required to create a frequency table while maintaining privacy of the user data values.

6. The machine-readable medium of claim 1, wherein the encoded vector is a Hadamard matrix and the value of user data represents a website visited by a user of the client device.

7. The machine-readable medium of claim 1, wherein only the privatized vector and the index value of the randomly selected variant is transmitted to the server as information representing the value of user data.

8. The machine-readable medium of claim 1, wherein privatizing the vector includes changing at least some of the values of the vector with a predefined probability, the predefined probability based on a privacy parameter.

9. The machine-readable medium of claim 8, wherein the privacy parameter represents a configured tradeoff between privacy and accuracy.

10. The machine-readable medium of claim 8, wherein the predefined probability is defined as $1/(1+e^{\varepsilon})$, and $\varepsilon$ is the privacy parameter.

11. An electronic device comprising:
    one or more processors; and
    a memory coupled to the one or more processors, the memory storing instructions, which when executed by the one or more processor, cause the one or more processors to perform operations comprising:
       selecting a value of user data to transmit to a server from a set of possible user data values collected on a client device;
       creating a hash of a term for the value of user data using a random hash function, wherein the random hash function is generated from a randomly selected variant of the term, and wherein a set of possible variants of the term is indexed;
       encoding at least a portion of the hash of the term for the value as a vector, wherein the encoding includes updating a value of the vector at a position corresponding to the hash;

privatizing the vector by changing at least some of the values of the vector with a predefined probability; and transmitting, to the server, the privatized vector and an index value of the randomly selected variant to enable the server to estimate of a frequency of the value of user data on a set of client devices.

12. The electronic device of claim 11, wherein:

the term is a string of characters and the randomly selected variant of the term includes one or more characters representing the index value of the variant appended to the string;

the server estimates the frequency of the value of user data by updating a frequency table indexed by the set of possible variants and a row or column of the frequency table corresponding to the index value of the random hash function is updated with the privatized vector; and the server estimates a frequency of each of the set of possible user data values amongst from data accumulated from the set of client devices.

13. The electronic device of claim 11, wherein the encoding includes initializing the vector with a uniform value and sign and updating the value of the vector includes flipping the sign of the value at the position corresponding to a created hash value.

14. The electronic device of claim 13, wherein initializing the vector includes setting each value of the vector to a value representing a constant and updating the value of the vector includes setting the value at the position corresponding to a created hash value to a value representing a sign flip of the constant.

15. The electronic device of claim 11, wherein the random hash function is to address hash collisions when using only the portion of a created hash value and to reduce a number of computations required to create a frequency table while maintaining privacy of the user data values.

16. The electronic device of claim 11, wherein the encoded vector is a Hadamard matrix and the value of user data represents a website visited by a user of the client device.

17. The electronic device of claim 11, wherein only the privatized vector and the index value of the randomly selected variant is transmitted to the server as information representing the value of user data.

18. The electronic device of claim 11, wherein privatizing the vector includes changing at least some of the values of the vector with a predefined probability, the predefined probability based on a privacy parameter.

19. The electronic device of claim 18, wherein the privacy parameter represents a configured tradeoff between privacy and accuracy.

20. The electronic device of claim 18, wherein the predefined probability is defined as $1/(1+e^\varepsilon)$, and $\varepsilon$ is the privacy parameter.

21. A method comprising:

selecting a value of user data to transmit to a server from a set of possible user data values collected on a client device;

creating a hash of a term for the value of user data using a random hash function, wherein the random hash function is generated from a randomly selected variant of the term, and wherein a set of possible variants of the term is indexed;

encoding at least a portion of the hash of the term for the value as a vector, wherein the encoding includes updating a value of the vector at a position corresponding to the hash;

privatizing the vector by changing at least some of the values of the vector with a predefined probability; and transmitting, to the server, the privatized vector and an index value of the randomly selected variant to enable the server to estimate of a frequency of the value of user data on a set of client devices.

22. The method of claim 21, wherein:

the term is a string of characters and the randomly selected variant of the term includes one or more characters representing the index value of the variant appended to the string;

the server estimates the frequency of the value of user data by updating a frequency table indexed by the set of possible variants and a row or column of the frequency table corresponding to the index value of the random hash function is updated with the privatized vector; and the server estimates a frequency of each of the set of possible user data values amongst from data accumulated from the set of client devices.

23. The method of claim 21, wherein the encoding includes initializing the vector with a uniform value and sign and updating the value of the vector includes flipping the sign of the value at the position corresponding to a created hash value.

* * * * *